(12) United States Patent
Fu et al.

(10) Patent No.: US 11,897,194 B2
(45) Date of Patent: Feb. 13, 2024

(54) METHOD AND SYSTEM FOR DYNAMIC CAPILLARY-DRIVEN ADDITIVE MANUFACTURING OF CONTINUOUS FIBER COMPOSITE

(71) Applicants: Kelvin Fu, Newark, DE (US); Baohui Shi, Newark, DE (US)

(72) Inventors: Kelvin Fu, Newark, DE (US); Baohui Shi, Newark, DE (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 17/404,365

(22) Filed: Aug. 17, 2021

(65) Prior Publication Data

US 2022/0048246 A1 Feb. 17, 2022

Related U.S. Application Data

(60) Provisional application No. 63/066,415, filed on Aug. 17, 2020.

(51) Int. Cl.
*B29C 64/165* (2017.01)
*B29C 64/321* (2017.01)
(Continued)

(52) U.S. Cl.
CPC .......... *B29C 64/165* (2017.08); *B29C 64/321* (2017.08); *B33Y 10/00* (2014.12);
(Continued)

(58) Field of Classification Search
CPC .. B32B 7/12; B32B 5/26; B29C 70/54; B29C 70/30; B29C 70/388; B29C 70/38;
(Continued)

(56) References Cited

U.S. PATENT DOCUMENTS

| 3,607,599 A | * | 9/1971 | McPherson | ............. B32B 27/00 428/105 |
| 2002/0062909 A1 | * | 5/2002 | Jang | ....................... B33Y 10/00 156/307.3 |

(Continued)

OTHER PUBLICATIONS

Bao et al., "Flexible, High Temperature, Planar Lighting with Large Scale Printable Nanocarbon Paper", Adv. Mater., 2016, 28, pp. 4684-4691.

(Continued)

*Primary Examiner* — Joseph S Del Sole
*Assistant Examiner* — Margaret B Hayes
(74) *Attorney, Agent, or Firm* — RatnerPrestia

(57) ABSTRACT

A process for additive manufacturing of a thermoset resin fiber reinforced composite comprises depositing a fiber material along a path having a direction; heating the fiber material using a heater to generate a moving thermal gradient in the fiber material trailing the heater relative to the path direction; and dispensing a thermosetting polymer material on the heated fiber material at a trailing distance the from the heater along the path. The thermosetting polymer dynamically wicks into the fiber material along the thermal gradient in the path direction.

13 Claims, 23 Drawing Sheets
(13 of 23 Drawing Sheet(s) Filed in Color)

(51) Int. Cl.
    *B33Y 10/00* (2015.01)
    *B33Y 70/10* (2020.01)
    *B33Y 30/00* (2015.01)
    *B29K 307/04* (2006.01)
    *B29K 63/00* (2006.01)

(52) U.S. Cl.
    CPC .............. *B33Y 30/00* (2014.12); *B33Y 70/10* (2020.01); *B29K 2063/00* (2013.01); *B29K 2307/04* (2013.01)

(58) Field of Classification Search
    CPC ..... B29C 64/209; B29C 64/295; B29C 64/10; B29C 64/336; B29C 48/0021; B33Y 10/00
    See application file for complete search history.

(56) References Cited

U.S. PATENT DOCUMENTS

| | | | |
|---|---|---|---|
| 2016/0136897 A1* | 5/2016 | Nielsen-Cole | B29C 64/194 425/150 |
| 2017/0001373 A1* | 1/2017 | La Forest | F16D 69/023 |
| 2019/0299522 A1* | 10/2019 | Chapiro | B29C 70/38 |

OTHER PUBLICATIONS

Blok et al., "An investigation into 3D printing of fibre reinforced thermoplastic composites", Additive Manufacturing, 22, 2018, pp. 176-186.
Brenken et al., "Fused filament fabrication of fiber-reinforced polymers: A review", Additive Manufacturing, 21, 2018, pp. 1-16.
Chatterjee et al., "3D Printing of Textiles: Potential Roadmap to Printing with Fibers", Adv. Mater., 2020, 32, 1902086, 24 pages.
Compton et al., "3D-Printing of Lightweight Cellular Composites", Adv. Mater., 2014, 26, pp. 5930-5935.
Escardino et al., "Liquid suction by porous ceramic materials 4: influence of firing conditions", British Ceramic Transactions, 98:5, pp. 225-229, Published 1999.
Ferreira et al., "Experimental characterization and micrography of 3D printed PLA and PLA reinforced with short carbon fibers", Composites, Part B, 124, 2017, pp. 88-100.
Ge et al., "Joule-heated graphene-wrapped sponge enables fast clean-up of viscous crude-oil spill", Nature Nanotechnology, vol. 12, May 2017, pp. 434-441.
Goh et al., "Recent Progress in Additive Manufacturing of Fiber Reinforced Polymer Composite", Adv. Mater. Technol., 2019, 4, 1800271, 22 pages.
Griffini et al., "3D-printable CFR polymer composites with dual-cure sequential IPNs", Polymer, 91, 2016, pp. 174-179.
Haberer et al., "Fluid mechanics of slot-coating in photopolymer-based rapid composites manufacturing", Proc. Instn. Mech. Engrs., 2003, vol. 217, Part C: J. Mechanical Engineering Science, pp. 65-79.
Hao et al., "Preparation and characterization of 3D printed continuous carbon fiber reinforced thermosetting composites", Polymer Testing, 65, 2018, pp. 29-34.
Huang et al., "Additive manufacturing and its societal impact: a literature review", Int. J. Adv. Manuf. Technol., 2013, 67, pp. 1191-1203.
Invernizzi et al., "UV-Assisted 3D Printing of Glass and Carbon Fiber-Reinforced Dual-Cure Polymer Composites", Materials, 2016, 9, 583, 12 pages.
Jing et al., "Surface modification of carbon fibers and the selective laser sintering of modified carbon fiber/nylon 12 composite powder", Materials & Design, Accepted Manuscript, Dec. 13, 2016, 49 pages.

Karalekas, D.E., "Study of the mechanical properties of nonwoven fibre mat reinforced photopolymers used in rapid prototyping", Materials and Design, 24, 2003, pp. 665-670.
Kokkinis et al., "Multimaterial magnetically assisted 3D printing of composite materials", Nature Communications, 2015, 6:8643, 10 pages.
Lee et al., "Advanced carbon fiber composite out-of-autoclave laminate manufacture via nanostructured out-of-oven conductive curing", Composites Science and Technology, 166, 2018, pp. 150-159.
Liao et al., "Properties of oriented carbon fiber/polyamide 12 composite parts fabricated by fused deposition modeling", Materials & Design, Accepted Manuscript, Nov. 13, 2017, 49 pages.
Love et al., "The importance of carbon fiber to polymer additive manufacturing", J. Mater. Res., vol. 29, No. 17, Sep. 14, 2014, pp. 1893-1898.
MacDonald et al., "Multiprocess 3D printing for increasing component functionality", Science, Sep. 30, 2016, vol. 353, Issue 6307, 10 pages.
Ming et al., "A Novel Route to Fabricate High-Performance 3D Printed Continuous Fiber-Reinforced Thermosetting Polymer Composites", Materials, 2019, 12, 1369, 13 pages.
Ning et al., "Additive manufacturing of carbon fiber reinforced thermoplastic composites using fused deposition modeling", Composites, Part B, 80, 2015, pp. 369-378.
Parandoush et al., "3D Printing of Ultrahigh Strength Continuous Carbon Fiber Composites", Adv. Eng. Mater., 2019, 21, 1800622, 8 pages.
Parandoush et al., "A review on additive manufacturing of polymer-fiber composites", Composite Structures, 182, 2017, pp. 36-53.
Quan et al., "Additive manufacturing of multi-directional preforms for composites: opportunities and challenges", Materials Today, vol. 18, No. 9, Nov. 2015, pp. 503-512.
Robertson et al., "Rapid energy-efficient manufacturing of polymers and composites via frontal polymerization", Nature, vol. 557, May 10, 2018, 12 pages.
Tian et al., "Interface and performance of 3D printed continuous carbon fiber reinforced PLA composites", Composites: Part A, 88, 2016, pp. 198-205.
Tian et al., "Recycling and remanufacturing of 3D printed continuous carbon fiber reinforced PLA composites", Journal of Cleaner Production, 142, 2017, pp. 1609-1618.
Van der Klift et al., "3D Printing of Continuous Carbon Fibre Reinforced Thermo-Plastic (CFRTP) Tensile Test Specimens", Open Journal of Composite Materials, 2016, 6, pp. 18-27.
Van der Werken et al., "Additively Manufactured Carbon Fiber-Reinforced Composites: State of the Art and Perspective", Additive Manufacturing, Nov. 19, 2019, 54 pages.
Van der Werken et al., "Design considerations and modeling of fiber reinforced 3D printed parts", Composites, Part B, 160, 2019, pp. 684-692.
Yang et al., "3D printing for continuous fiber reinforced thermoplastic composites: mechanism and performance", Rapid Prototyping Journal, 23/1, 2017, pp. 209-215.
Zak et al., "Mechanical properties of short-fibre layered composites: Prediction and experiment", Rapid Prototyping Journal, 6(2), pp. 107-118, Published 2000.
Zhu et al., "A novel method based on selective laser sintering for preparing high-performance carbon fibres/polyamide12/epoxy ternary composites", Scientific Reports, 6:33780, 10 pages, Published 2016.
Fu et al., "Progress in 3D Printing of Carbon Materials for Energy-Related Applications", Adv. Mater., 2017, 29, 1603486, 20 pages, Published 2017.

* cited by examiner

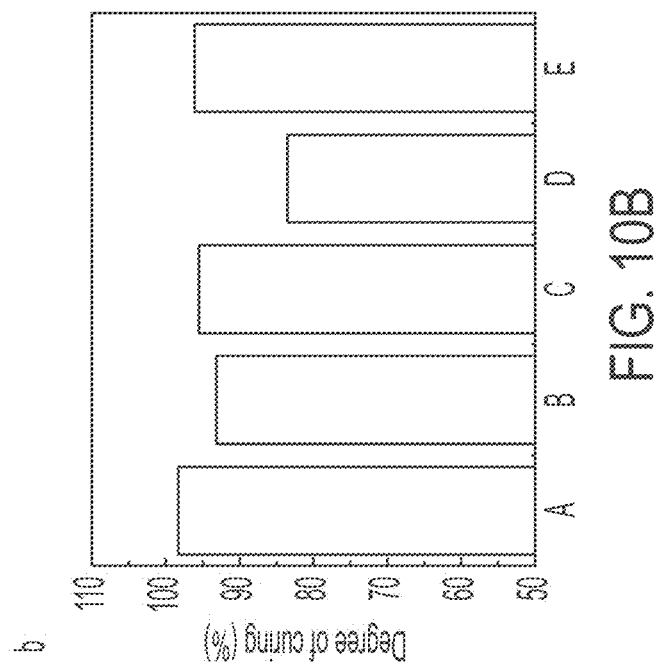
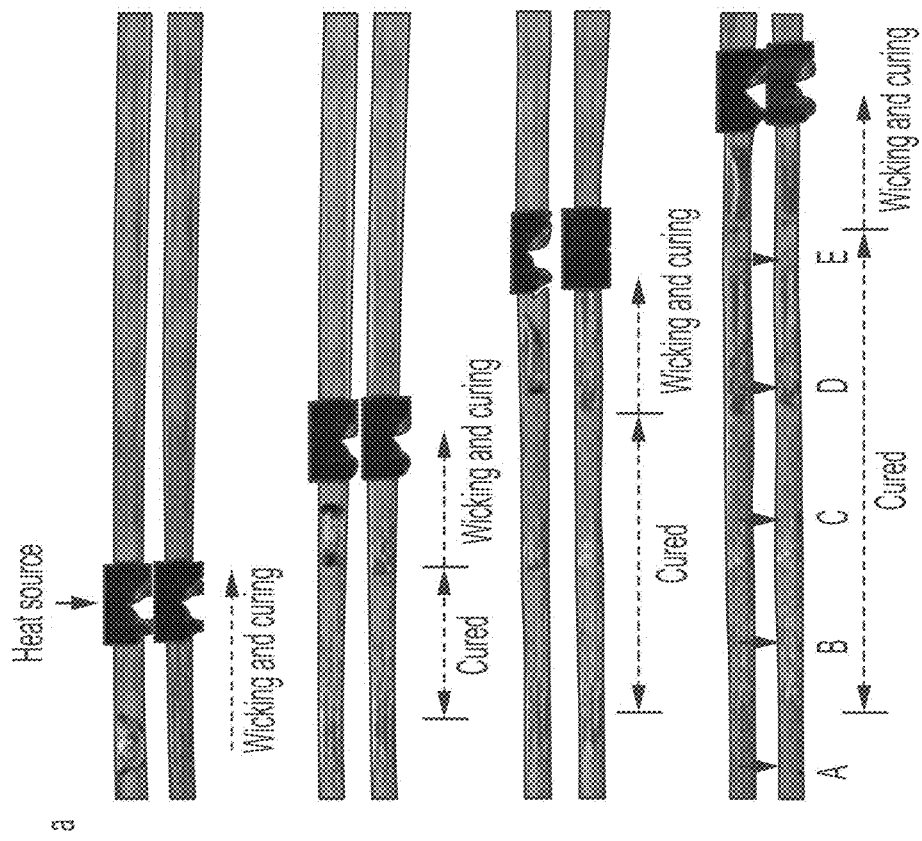

METHOD AND SYSTEM FOR DYNAMIC CAPILLARY-DRIVEN ADDITIVE MANUFACTURING OF CONTINUOUS FIBER COMPOSITE

CROSS-REFERENCE TO RELATED APPLICATIONS

This application claims priority from U.S. Provisional application Ser. No. 63/066,415, titled "LOCALIZED IN-PLANE HEATING-ASSISTED ADDITIVE MANUFACTURING OF THERMOSET COMPOSITES WITH CONTINUOUS FIBER REINFORCEMENT," filed Aug. 17, 2020, the entirety of which is incorporated herein by reference.

BACKGROUND OF THE INVENTION

Aspects of this invention relate to a method and system for additive manufacturing (AM), and more particularly, to a 3D printing method and system for dynamic capillary-driven additive manufacturing of continuous fiber reinforced composites (e.g. carbon fiber composites), capable of fabricating net-shape composites of complex geometries and functionalities.

Continuous fibers are geometrically characterized as having a very high length-to-diameter ratio. They are generally stronger and stiffer than bulk material. Fiber diameters generally range between 0.00012 and 0.0074 pin (3-200 μm), depending upon the fiber. Thermosetting polymers are obtained by irreversibly hardening ("curing") a soft solid or viscous liquid prepolymer (resin). Curing is induced by heat or suitable radiation and may be promoted by high pressure, or mixing with a catalyst.

Fiber reinforced polymer composites (FRPC) made with the continuous carbon fibers and thermosetting polymers exhibit excellent specific mechanical properties (high strength, stiffness, and toughness), thermal stability, and chemical resistance. As such, they are lightweight and energy-efficient structural materials used widely in aerospace, automotive, marine, construction, and energy applications.

Conventional technologies for manufacturing thermoset/carbon fiber composites include several complex and high-cost processes such as fiber/fabric layup, liquid resin wetting, and heat curing, which are labor intensive and energy and time consuming. In addition, lack of design flexibility in conventional composite manufacturing limits the ability to produce composites with complicated, near net shape architectures, constraining structural and functional capability in end-use products.

Additive manufacturing (AM), which offers the opportunity to fabricate net-shape composites of complex geometry and functionality, is increasingly evolving from single material printing to multimaterial printing and from parts prototyping to net-shape manufacturing. As a result, there is increased interest in the use of AM technology to replace conventional manufacturing techniques for structural and functional composites in 3D printing.

In recent years, the 3D printing of composites has been successfully demonstrated using thermoplastic polymers and discontinuous fillers. But the resulting 3D printed composites often have poor mechanical properties and low service temperature, due to the limitations of the constituent properties. Consequently, the 3D printing of composites using continuous carbon fibers and thermosetting polymers is expected to offer exceptional mechanical properties and thermal stability as well as featured design flexibility, low cost, reliability and repeatability.

However, no AM technique has been reported to process continuous carbon fibers and thermosetting polymers for the 3D printing of the finished composite. Thermosetting polymers suffer a significant decrease in viscosity before suddenly turning into a solid. The temperature dependence of viscosity makes it difficult to infuse thermosetting polymers into a fiber structure and cure promptly into a solid while retaining a desirable pattern during the additive manufacturing process.

Thus, it is of interest to develop a method and system for additive manufacturing that uses continuous carbon fibers and thermosetting polymers for 3D printing of a finished composite with a controllable viscosity and degree of curing of the thermosetting polymer to enable fast and near-simultaneous infusion and curing, yielding in situ solidification of composites into arbitrary 3D shapes.

SUMMARY OF THE INVENTION

One aspect of the invention comprises a process for additive manufacturing of a thermoset resin fiber reinforced composite. The process comprises depositing a fiber material along a path having a direction, heating the fiber material using a heater to generate a moving thermal gradient in the fiber material trailing the heater relative to the path direction, and dispensing a thermosetting polymer material on the heated fiber material at a trailing distance the from the heater along the path. The thermosetting polymer dynamically wicks into the fiber material along the thermal gradient in the path direction.

In one embodiment, the fiber material comprises one or more continuous carbon fibers, a carbon-containing material, or one or more non-carbon fibers coated with a carbon-containing material. The thermosetting polymer comprises an epoxy. The epoxy comprises two-part system comprising a resin and a curing agent, and the method comprises mixing the resin and the curing agent prior to dispensing the material on the heated fiber material.

In another embodiment, the fiber material comprises a plurality of fibers defining one or more spaces between neighboring fibers and the thermosetting polymer wicks into the one or more spaces and surrounds the plurality of fibers.

In still another embodiment, the fiber material comprises one or more porous fibers having a plurality of pores and the thermosetting polymer wicks into the one or more pores. The thermosetting polymer has a viscosity that decreases with increasing temperature along the thermal gradient.

The process may further comprises placing the heater in contact with the fiber material during the step of heating the fiber material. The path is defined on a 2D or 3D substrate or in free space.

The process may further comprises depositing a plurality of layers one on top of another to form the composite, and performing the process using a printing head attached to an automated robot arm having at least three degrees of freedom. The printing head includes a source of the fiber material, a guide for disposing the fiber material in a desired location, the heater spaced a trailing distance from the guide relative to the path direction, and a dispenser for dispensing the thermosetting polymer material at a trailing distance from the heater.

Another aspect of the invention comprises a thermoset resin fiber reinforced composite material comprising a product of the above-noted process.

Still another aspect of the invention comprises a system for additive manufacturing of a fiber reinforced composite. The system comprises a fiber dispenser, a heater, and a thermoset polymer material dispenser, and means for moving the fiber dispenser, the heater, and the thermoset polymer material dispenser along a path having a direction. The fiber dispenser is configured to dispose the fiber material along the path, the heater is configured to heat the fiber material disposed along the path and to generate a thermal gradient in the fiber material trailing the heater relative to the path direction, and the thermoset polymer material feeder is spaced a trailing distance from the heater and configured to dispense a thermoset polymer on the heated fiber material.

In one configuration, the thermoset polymer material comprises a material having properties conducive to wicking of the thermoset polymer material in the path direction along the thermal gradient. The thermosetting polymer has a decreasing viscosity from low temperature to high temperature within the temperature gradient. The thermoset polymer material comprises an epoxy resin.

In another configuration, the fiber material comprises one or more continuous carbon fibers, a carbon-containing material, or one or more non-carbon fibers coated with a carbon-containing material. The fiber material comprises a plurality of fibers that define one or more spaces between neighboring fibers, the fiber material is porous, or a combination thereof.

In still another configuration, the heater is disposed in contact with a surface of fiber material. The means for moving the printing head comprises a robot arm having three degrees of freedom in translation. The fiber dispenser, a heater, and a thermoset polymer material dispenser are integrated into a unitary printing head. The fiber dispenser comprises a spool for storing fiber prior to dispensing the fiber along the path, and a guide disposed ahead of the heater along the path direction for guiding the dispensed fiber onto the path.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 10A and 10B illustrate microscopic characterization of 3D printed composites in accordance with one exemplary embodiment.

DETAILED DESCRIPTION OF THE INVENTION

Aspects of the invention relate to a 3D printing method and system using a dynamic, capillary-driven, AM approach. This approach includes a Localized In-plane Thermal Assisted (LITA) 3D printing process that is capable of achieving a controllable viscosity and degree of curing of liquid epoxy resin (e.g., thermosetting polymer) to enable fast and near-simultaneous infusion and curing, yielding in situ solidification of composites into arbitrary 3D shapes.

As will be described in detail, the LITA 3D printing process is based on a continuous capillary effect or wicking, which is enabled by a moving thermal gradient along surfaces of continuous carbon fibers, to facilitate the flow of the liquid thermosetting polymer into the tube-like space between neighboring continuous carbon fibers, followed by curing of the liquid thermosetting polymer from the heated surfaces of the continuous carbon fibers to the surrounding space. The thermal gradient along the continuous carbon fibers can decrease the viscosity of the dispensed liquid thermosetting polymer, which brings changes in physical properties of the thermosetting polymer such as surface energy and contact angle. As a result, the capillary effect can be seen in the flow of the liquid thermosetting polymer towards the higher temperature region of the continuous carbon fibers; curing can then be triggered.

Figure 1A:
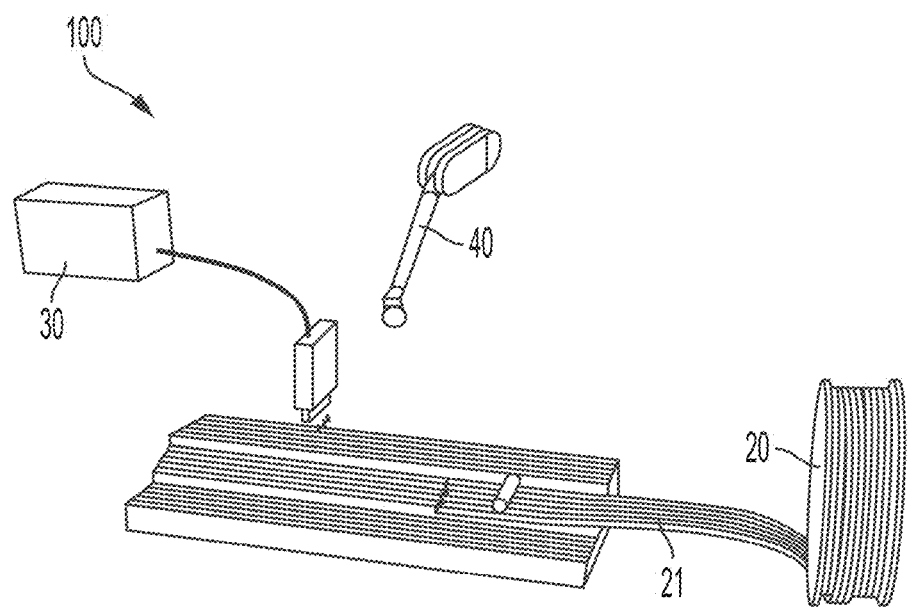
FIGS. 1A-1D are schematic views illustrating a principle of dynamic capillary-driven additive manufacturing of continuous carbon fiber thermoset composite in accordance with one exemplary embodiment of the invention.

FIGS. 1A-1D are schematic views illustrating a principle of dynamic capillary-driven additive manufacturing of continuous carbon fiber thermoset composite in accordance with one exemplary embodiment of the invention. FIG. 1A schematically shows a 3D-printing system 100 using an LITA 3D printing process based on the dynamic capillary-driven infusion and curing of thermosetting polymer. The 3D-printing system 100 may include a heater 10, a first printing material feeder 20, a second printing material feeder 30, and a robot arm 40.

The first printing material feeder 20 is configured to accommodate a first printing material therein, and is positioned, by a first positioning device (not shown), to supply the first printing material for forming a 3D product. In this embodiment, the first printing material may be continuous carbon fibers 21 that are laid down in a fiber structure that includes a gap 23 between neighboring continuous carbon fibers 21.

The second printing material feeder 30 is configured to accommodate a second printing material therein and is positioned, by a second positioning device (not shown), to supply the second printing material to incorporate with the first printing material for forming the 3D product. In this embodiment, the second printing material may be a flowable material, which may be a liquid epoxy resin, and preferably, a thermosetting polymer 31, which generally is considered to have better mechanical properties and higher thermal and chemical resistance than a thermoplastic material. The thermosetting polymer 31 is able to wick into the fiber structure (the gap 23) and surround the continuous carbon fibers 21. If the continuous carbon fibers 21 are porous, the thermosetting polymer 31 may infuse into the continuous carbon fibers 21.

In this exemplary embodiment of the LITA 3D printing process, the heater 10 touches the continuous carbon fibers 21, which may be in an initial dry condition, and moves over the continuous carbon fibers 21, thereby forming a temperature gradient (a graded temperature distribution) along surfaces 25 of the continuous carbon fibers 21 trailing the heater. Heater 10 is configured to activate at a temperature sufficient to form the desired temperature gradient for the specific thermosetting polymer used.

Second printing material feeder 30 is positioned to supply the liquid thermosetting polymer 31 to the continuous carbon fibers 21, and to cure after the liquid thermosetting polymer 31 flows into the gaps 23 between the neighboring continuous carbon fibers. The temperature gradient across the carbon fibers 21 as created by heater 10 causes the liquid thermosetting polymer 31 to have a decreasing viscosity across the temperature gradient from a relatively low viscosity in a relatively low temperature region where the resin is dispensed to a relatively high viscosity at a relatively high temperature region on the continuous carbon fibers 21. The actual temperatures and viscosity properties will depend upon the characteristics of the resin used. Changes in the physical properties of the thermosetting polymer 31 due to the changes in viscosity, such as changes in surface energy and contact angles, facilitate the capillary effect in the flow of the liquid polymer into the tube-shaped space between neighboring carbon fibers.

The temperature gradient created by use of the heater 10 facilitates flow of the thermosetting polymer 31 to wet the continuous carbon fibers 21 while avoiding the formation of voids within the composite formed by the thermosetting polymer and the continuous carbon fibers (as will be shown and described in details later). By repeatedly performing the above process, a 3D structure may be thus formed.

Figure 1B:
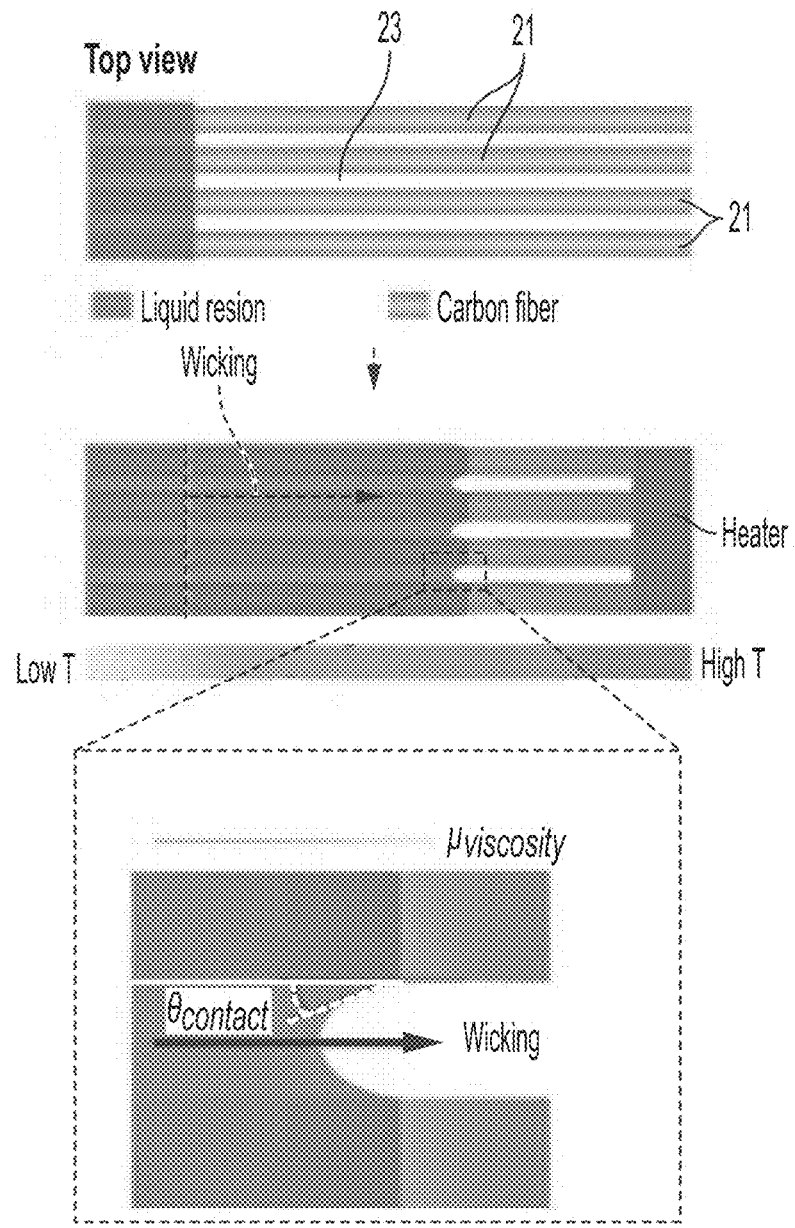

FIG. 1B illustrates that the capillary effect facilitates flow of the liquid polymer into the tube-like space between neighboring carbon fibers, followed by curing of the polymer resin to enable 3D printing. As shown in FIG. 1B, the decreasing of the viscosity of the liquid thermosetting polymer 31 brings changes in its physical properties such as surface energy and contact angles, and the capillary effect can be seen in the flow of the liquid thermosetting polymer 31 into the tube-shaped space between the neighboring continuous carbon fibers 21.

The behavior of the liquid thermosetting polymer 31 moving along the thermally graded continuous carbon fibers 21 is referred to herein as "dynamic wicking," which allows good fiber wetting and impregnation of the porous carbon fiber structure to avoid the formation of voids and bubbles in the composite. The dynamic wicking behavior of the liquid thermosetting polymer 31 as it moves along the thermally graded continuous carbon fibers 21 can be evaluated based on Eq. (1) using the liquid absorption coefficient $K_s$, where a higher $K_s$ value indicates a higher liquid absorbing capability of the continuous carbon fibers 21.

$$K_s = \left[d_1 \sqrt{\frac{\gamma}{\mu}}\right]\left[\sqrt{\frac{\varepsilon^*}{\lambda}} \sqrt{r_0}\right]\left[\sqrt{\frac{\cos\theta}{2}}\right] \quad (1)$$

where $d_1$, $\gamma$ and $\mu$ are the density, surface tension and viscosity of the thermosetting polymer 31, respectively; $\varepsilon^*$ is the effective sorption porosity of the sorbent (carbon fiber structure); $\lambda$ is the average tortuosity factor of the capillaries ($\lambda>1$); $r_0$ is the average pore radius (interspace between neighboring continuous carbon fibers 21); and $\theta$ is the contact angle of the interface between the thermosetting polymer 31 and the continuous carbon fiber 21. The three brackets in Eq. (1) represent the property of the liquid thermosetting polymer 31, the pore structure of the continuous carbon fibers 21, and their interface, respectively.

In Eq. (1), factor $$\left[\sqrt{\frac{\varepsilon^*}{\lambda}} \sqrt{r_0}\right],$$

which represents the pore structure of the continuous carbon fibers 21, is considered constant during the wicking process. As a result, the dynamic wicking is mainly dominated by the surface tension $\gamma$, viscosity $\mu$, and contact angle $\theta$.

Figure 1C:
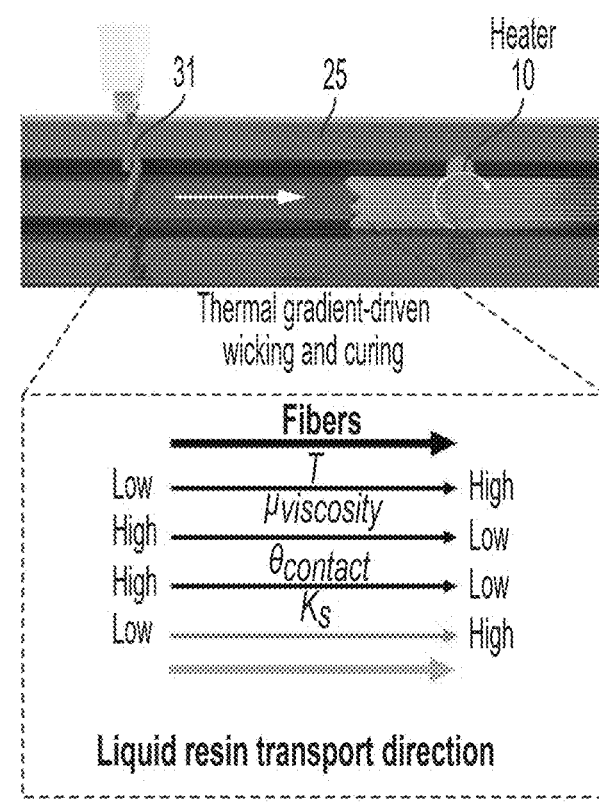
Figure 5:
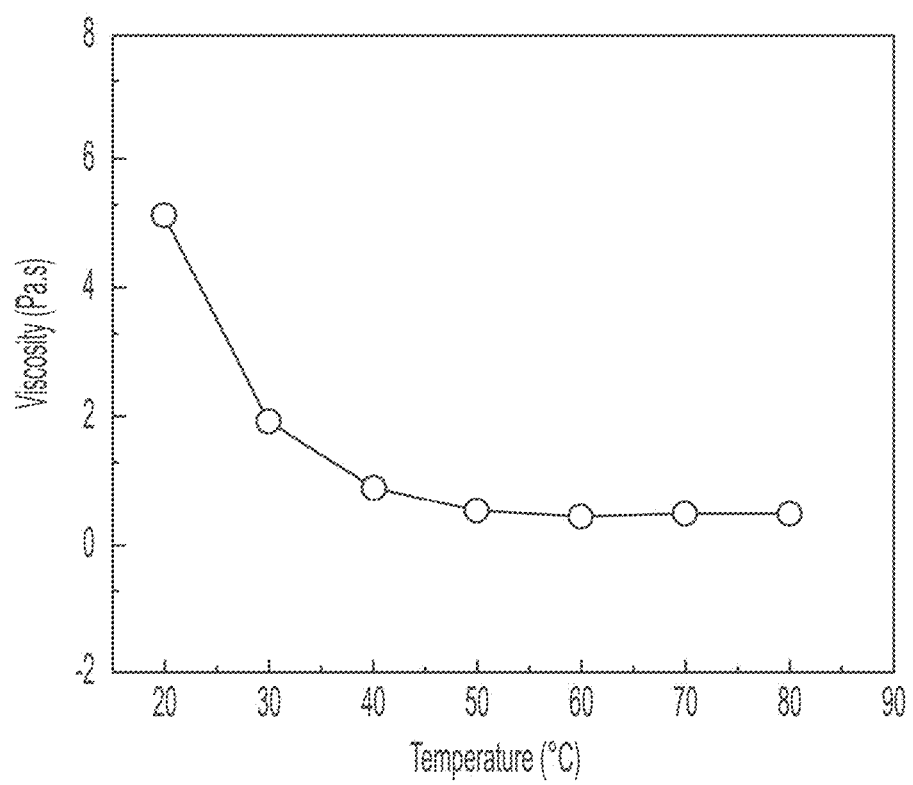
FIG. 5 is a graph schematically illustrating a relationship between resin temperature and viscosity of the epoxy resin.
Figure 6:
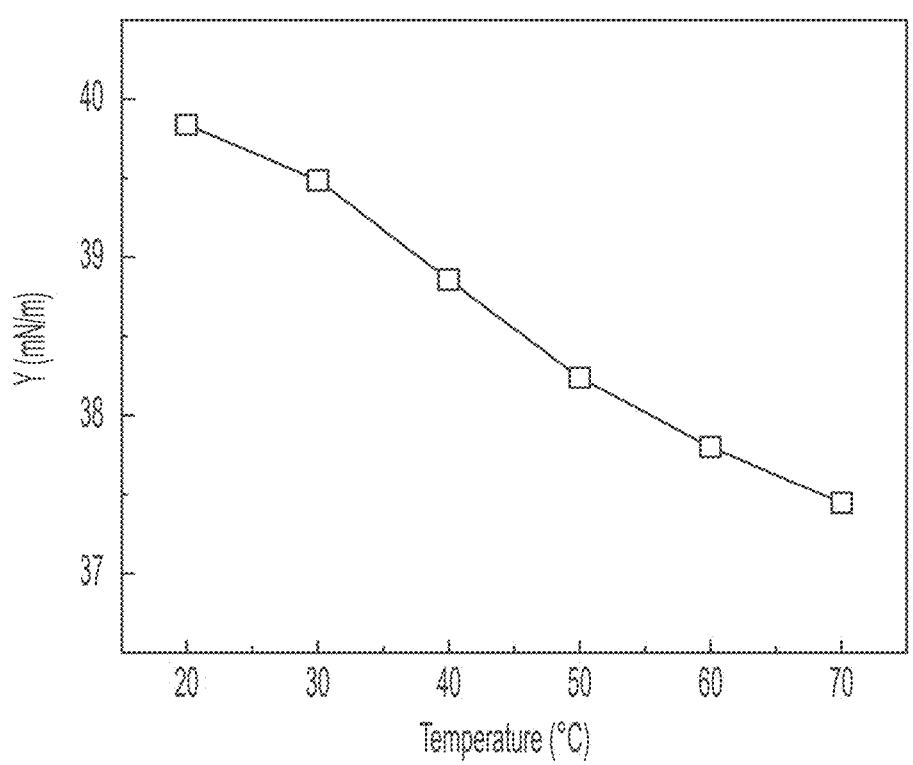
FIG. 6 is a graph schematically illustrating a relationship between the resin temperature and the surface tension of the epoxy resin.
Figure 7:
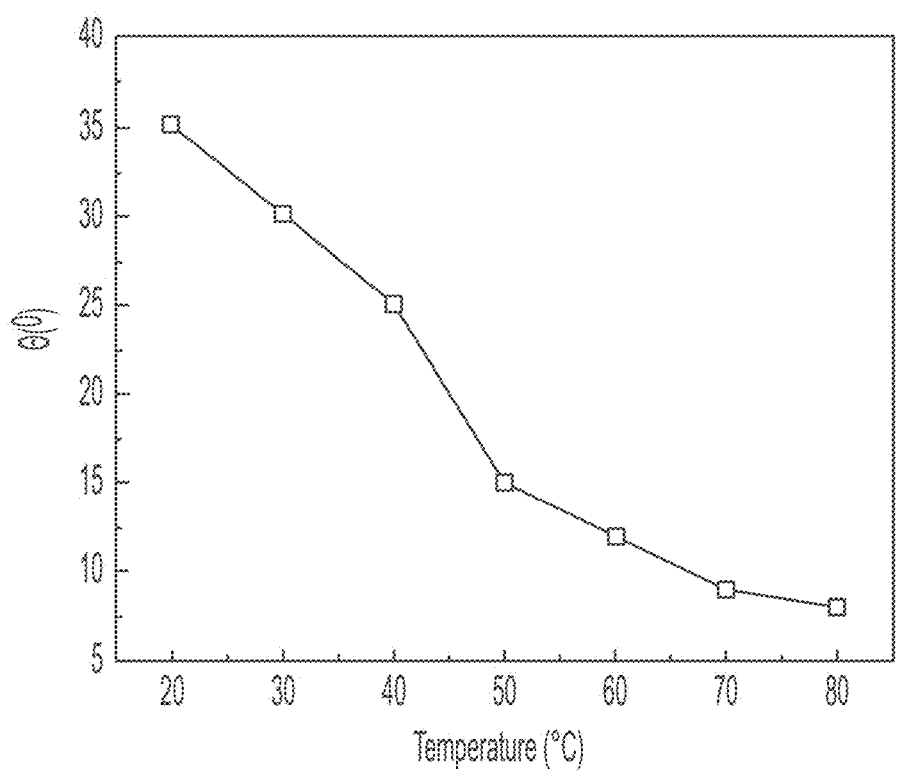
FIG. 7 is a graph schematically illustrating a relationship between the resin temperature and contact angle of the epoxy resin.
Figure 8A:
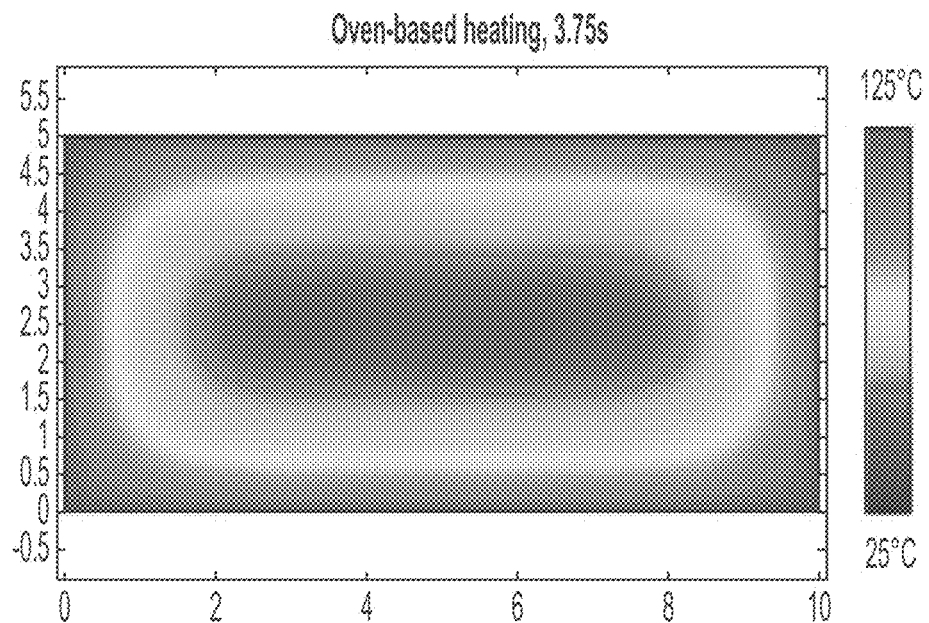
FIGS. 8A-8D show a comparison between oven-based hating and in-composite heating.
Figure 8B:
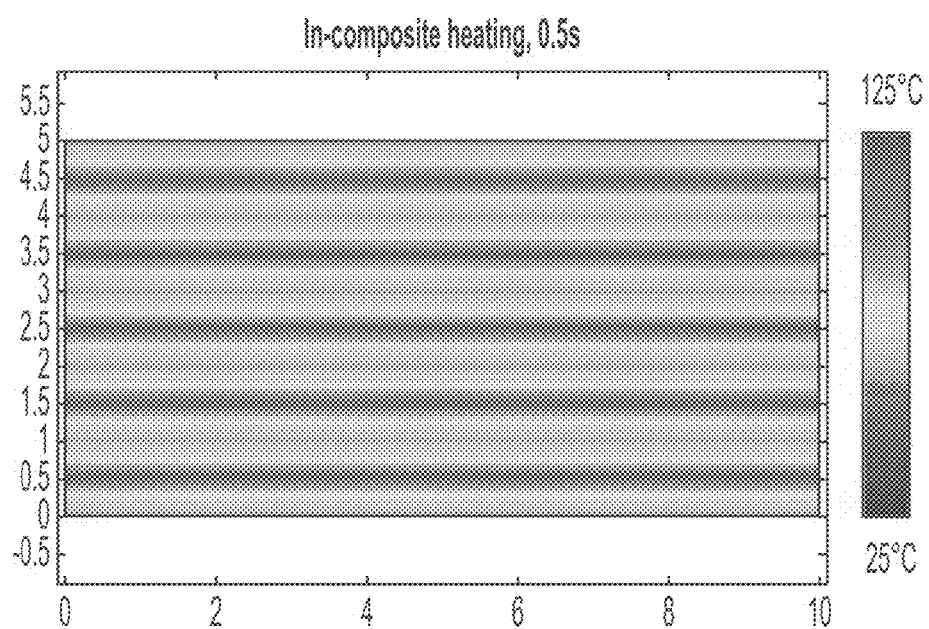
Figure 8C:
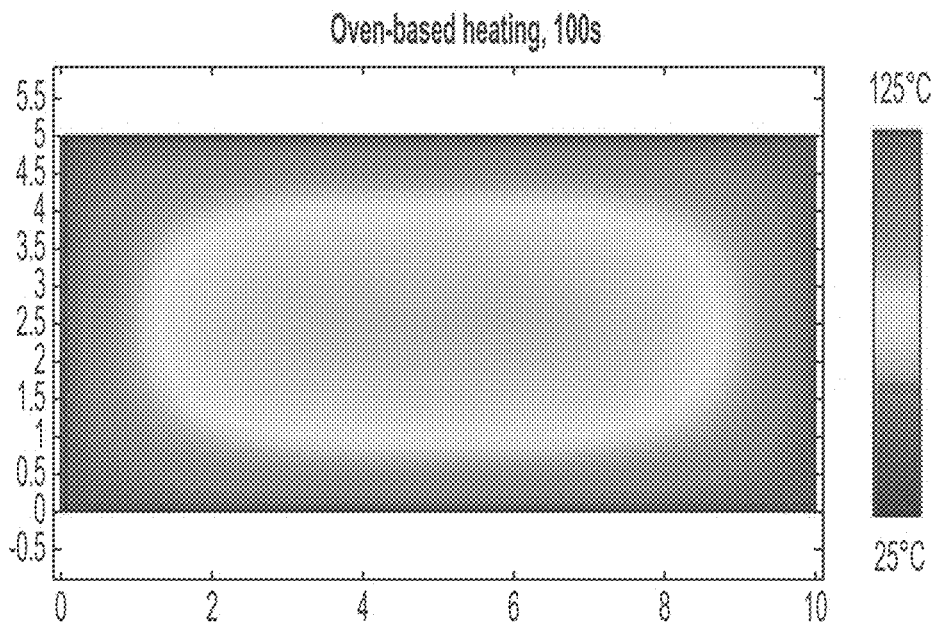
Figure 8D:
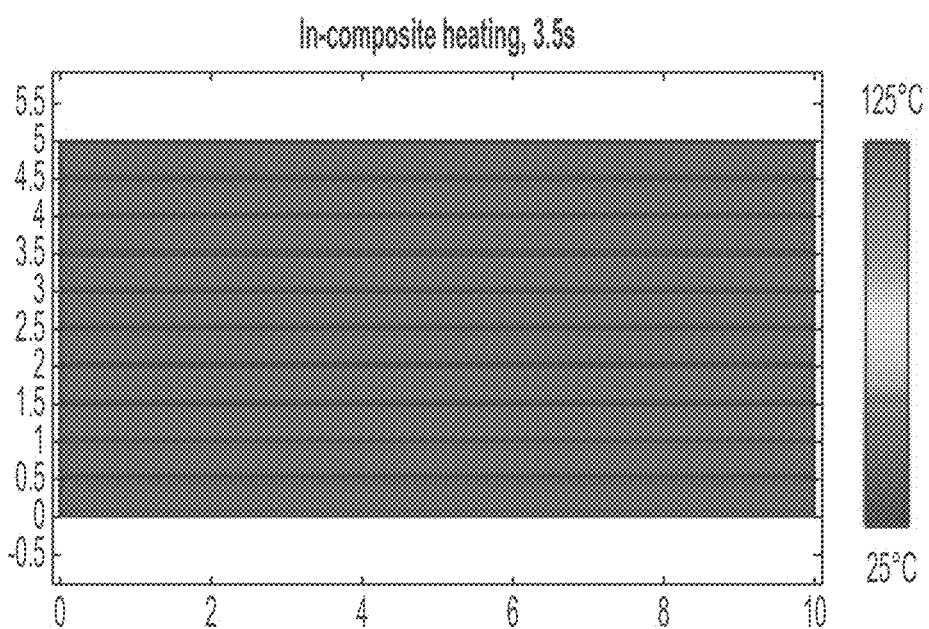

FIG. 5 is a graph illustrating a relationship between the resin temperature and the parameter of the viscosity $\mu$. FIG. 6 is a graph illustrating a relationship between the resin temperature and the parameter of the surface tension $\gamma$. FIG. 7 is a graph illustrating a relationship between the resin temperature and the parameter of the contact angle $\theta$. As shown in FIGS. 5-7, the surface tension $\gamma$, viscosity $\mu$, and contact angle $\theta$ follow a decreasing trend along the continuous carbon fibers 21 from the resin (thermosetting polymer 31) dispensing area to the heater 10. Such a decreasing trend of each of the parameters is also illustrated by FIG. 1C. As shown in FIG. 1C, graded distribution of temperature, resin viscosity, contact angle, and resin absorption coefficient $K_s$ along the carbon fibers, resulting in the dynamic transport of liquid resin. The thermally graded porous carbon fiber structure gives rise to an increasing liquid absorption coefficient $K_s$ along the fiber longitudinal direction to promote dynamic liquid transport.

Figure 1D:
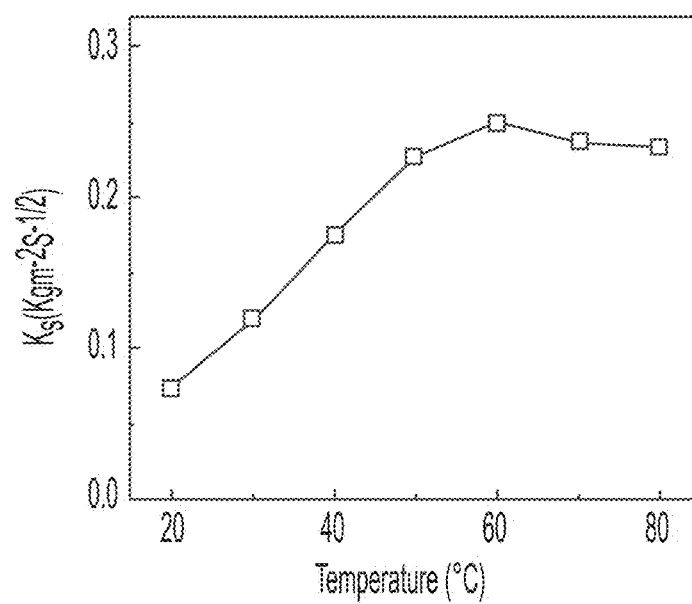

FIG. 1D is a graph illustrating a relationship between the temperature and the calculated $K_s$ values, which exhibits an increasing trend from ~0.07 to ~0.25 $Kgm^{-2}s^{-1/2}$ and reaches a peak at the temperature of 60° C. $K_s$ as a function of temperature. Higher $K_s$ suggests better absorption of the liquid polymer into porous carbon fiber structures. As shown in FIG. 1D, from the peak at the temperature of 60° C., the $K_s$ value decreases as temperature increases. The increased $K_s$ values suggest an enhanced liquid thermosetting polymer sorption capability of carbon fiber structures as the local fiber temperature increases. The reason for the absorption coefficient $K_s$ decreases after 60° C. is mainly due to the viscosity p of the thermosetting polymer 31 significantly decreases due to the formation of thermoset polymer cross-linking at the critical temperature point above 60° C.

The heating from the continuous carbon fibers 21 not only facilitates wetting of the liquid thermosetting polymer 31 and impregnation of the continuous carbon fibers 21, but also enables rapid and energy-efficient curing of the thermosetting polymer 31.

Moreover, the heat conducted by the continuous carbon fibers 21 serves as an internal heater and allows the curing of the thermosetting polymer 31 to propagate from the surfaces 25 of the continuous carbon fibers 21 to the surrounding space including the gaps 23 of the continuous carbon fibers 21, which is different from conventional composite fabrication using an oven. In particular, the LITA curing process may be considered as an "inside-out" curing process of the composite, while the conventional oven-based heating is an "outside-in" curing process.

Figure 9A:
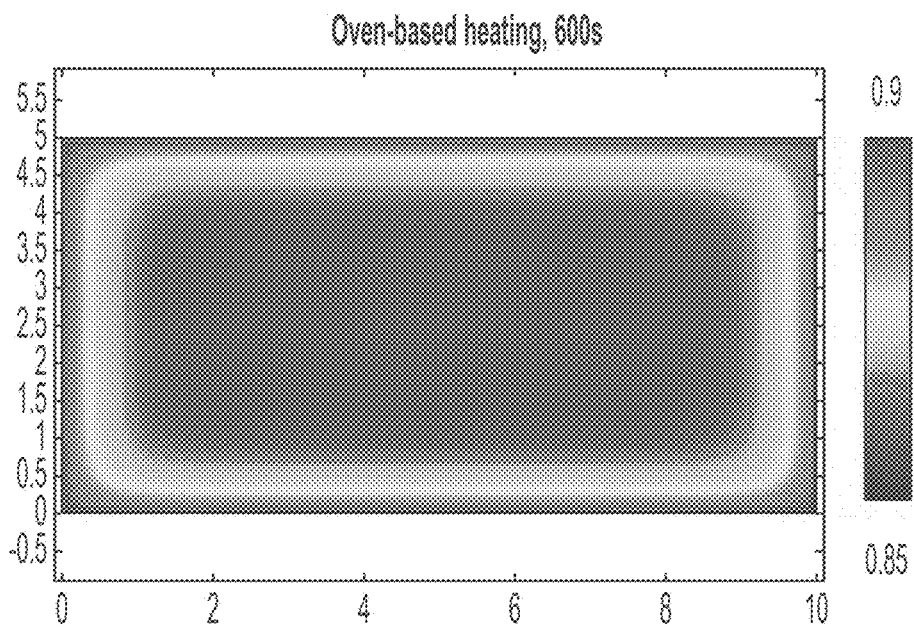
FIGS. 9A-9B show another comparison between the oven-based hating and the in-composite heating.
Figure 9B:
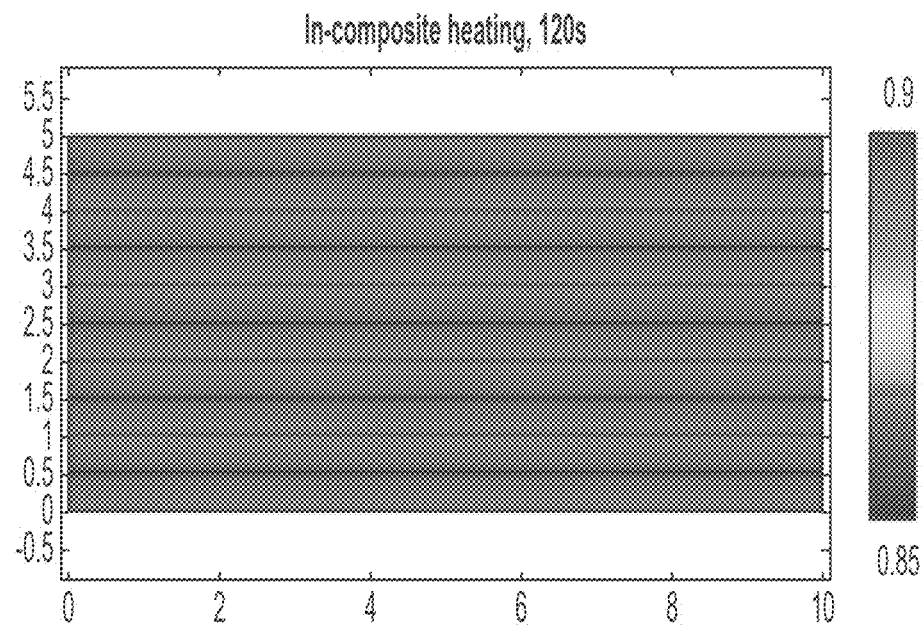

FIGS. 8A-8D, and FIGS. 9A-9B schematically depict simulation results showing how the LITA curing process features a more rapid solidification of polymers with a high degree of curing and a more uniform temperature distribution through the transverse direction of the fibers than that of composites heated conventionally in an oven. Specifically, as shown in FIGS. 8A-8D, the temperature in the laminates increases faster in in-composite heating than in oven-based heating. In in-composite heating, the temperature in the whole laminate almost increases to 125° C. at 3.5 s. Meanwhile, the temperature is more uniformly distributed in in-composite heating. The phenomenon may be attributed to the more uniform heating source in in-composite heating. As shown in FIGS. 9A-9B, the degree of curing of composites processed by in-composite heating and by oven-based heating are compared. In in-composite heating, the curing degree of laminates reached above 0.9 at 120 s. However, the degree of curing is non-uniformly distributed in oven-based heating.

The dynamic capillary-driven infusion and curing of the liquid thermosetting polymer 31 has been experimentally confirmed. FIGS. 2A-2F are views schematically illustrating the dynamic capillary-driven infusion and curing of a thermoset composite with continuous carbon fibers in accordance with one exemplary embodiment using an amount of Bisphenol A (an epoxy resin) for the thermosetting polymer.

Figure 2A:
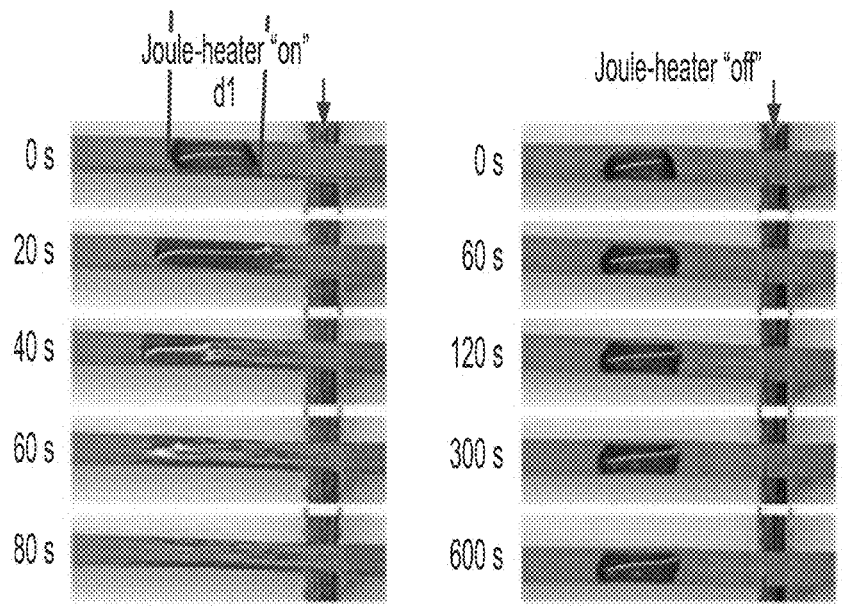
FIGS. 2A-2F are schematic views illustrating the dynamic capillary-driven infusion and curing of a thermoset composite with continuous carbon fibers in accordance with one exemplary embodiment.

FIG. 2A illustrates the capillary-driven infusion of liquid resin in the porous carbon fiber structure. No obvious wicking can be seen without heating. In the exemplary embodiment illustrated in FIG. 1B, the liquid thermosetting polymer 31 transports horizontally along the continuous carbon fibers 21 at a distance d1 (in FIG. 2A) of ~10 mm, and polymer impregnation of the porous fiber structure is accomplished in ~80 seconds. The distance d1 of ~10 mm is a movement length of the thermosetting polymer 31 on the surface 25 of the continuous carbon fiber 21. A distance d2 (in FIG. 2B) between the heater 10 and a front of the liquid thermosetting polymer 31 is set at ~10 mm, and a temperature of the heater 10 is set at ~280° C. The distance d1 is substantially equal to the distance d2.

The heater 10 in this embodiment is a resistive CNT-based joule-heater, which has fast heating rate, good temperature control, and soft contact area in providing a controllable and stable heating source to the continuous carbon fibers 21. In comparison, if no heating is applied to the continuous carbon fibers 21 as shown by the right side of FIG. 2A, the liquid thermosetting polymer 31 stays on the surfaces 25 of the continuous carbon fibers 21 and shows poor wetting and non-wicking behavior.

Figure 2B:
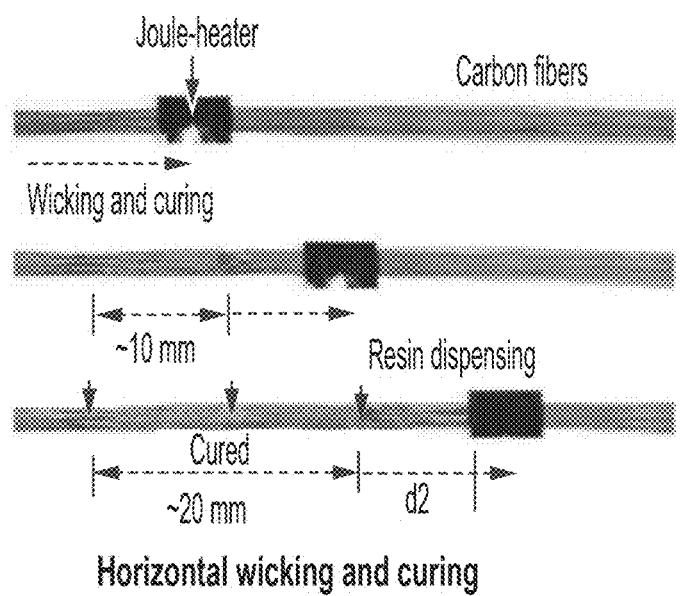

FIG. 2B shows the dynamic and continuous infusion and curing of liquid resin along the carbon fiber longitudinal direction. Liquid resin propagated along the fibers, following the moving heater. As shown in FIG. 2B, the liquid thermosetting polymer 31 is continuously fed onto the continuous carbon fibers 21, driven by a moving resin nozzle 33 (in FIG. 3A) and the moving heater 10 to enable continuous printing. FIGS. 10A and 10B illustrate microscopic characterization of the 3D printed composites, which demonstrates that the liquid thermosetting polymer 31 is completely infused into the continuous carbon fibers 21 and cured in situ.

Figure 2C:
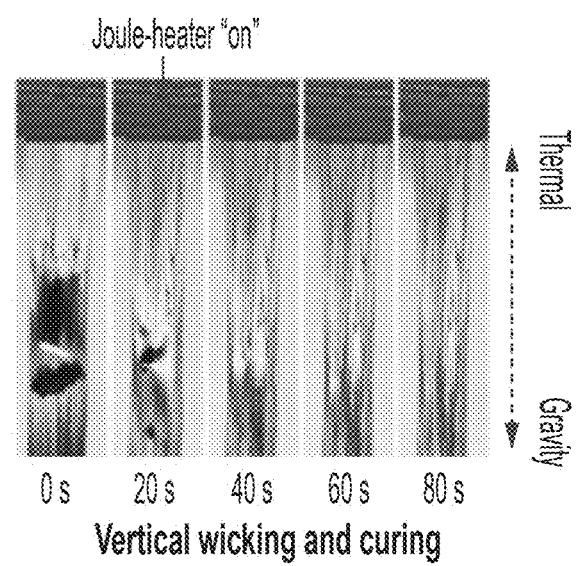
Figure 11:
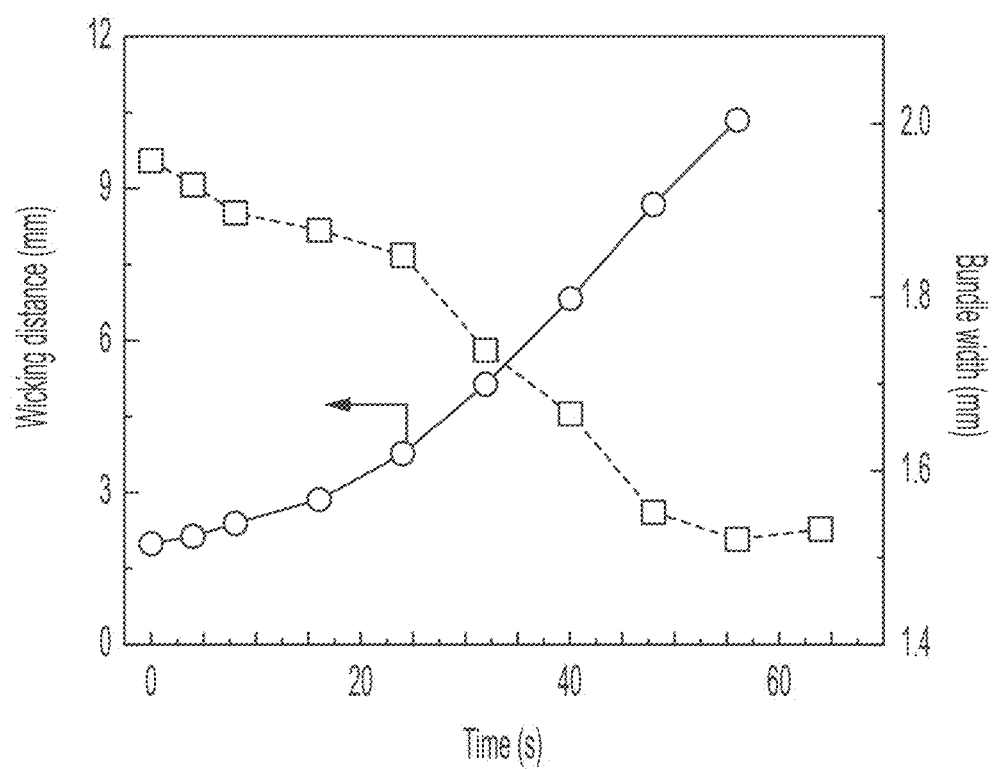
FIG. 11 schematically shows a relationship between wicking distance and bundle width as a function of time in accordance with one exemplary embodiment.

FIG. 2C shows vertical wicking and curing of liquid resin. As shown in FIG. 2C, the liquid thermosetting polymer 31 may move vertically up the continuous carbon fibers 21 via capillary action even in opposition to gravity. The composite may be densified by the capillary effect, resulting in a high fiber volume fraction. FIG. 11 shows a relationship between wicking distance and bundle width as a function of time. The wicking distance is defined as a length of resin flow and impregnation along axial carbon fibers driven by the graded temperature. As shown in FIG. 11, during the wicking of the liquid thermosetting polymer 31, the wicking distance increases in the form of a quadratic curve, and the widths of wicking bundles decrease gradually due to the surface tension of liquid thermosetting polymer.

Although described primarily above with respect to the use of continuous carbon fibers 21, the LITA curing process may also be applicable to other types of carbon-based fibers (e.g., fibers comprised of or consisting of carbon nanomaterials, such as carbon nanotube (CNT) material and graphene) or non-carbon fibers coated with carbon materials (e.g., CNT coated fibers). Any fiber compositions having suitable, thermal conductivity to implement thermal-driven wetting and curing may be acceptable for use in LITA processes. For example, high-thermal conductivity carbon nanotubes may be coated on the surface of glass or Aramid fibers to give them sufficient thermal conductivity to achieve dynamic wicking and curing.

Figure 2D:
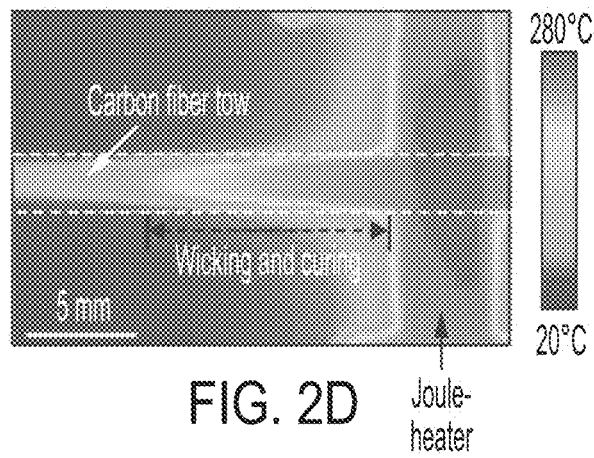
Figure 12:
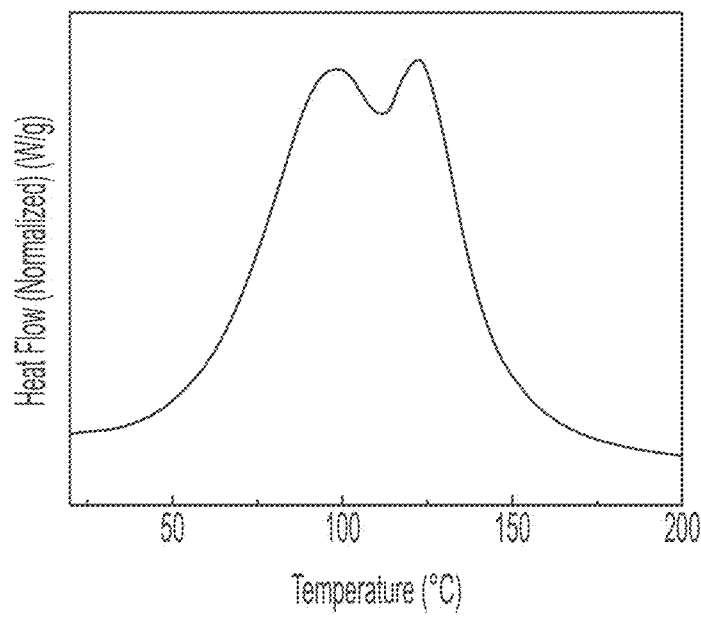
FIG. 12 is a graph schematically showing a relationship between a temperature range and a heat flow of the epoxy resin in accordance with one exemplary embodiment.

FIG. 2D is a picture taken by an infrared (IR) camera, showing a graded temperature distribution on the carbon fibers during wicking and curing. As shown in FIG. 2D, the graded temperature distribution along the continuous carbon fibers 21 with the joule-heater 10 is monitored, and the effective wicking and curing zone with a length of ~10 mm and a temperature range of 60° C.-150° C. of the thermosetting polymer 31 are identified. FIG. 12 (FIG. 513) also shows this temperature range of 60° C.-150° C. allows the thermosetting polymer 31 used in this exemplary embodiment to begin an exothermic reaction, as confirmed by the differential scanning calorimetry (DSC) of a pure liquid thermosetting polymer similar to that used in the embodiments discussed herein.

Figure 2E:
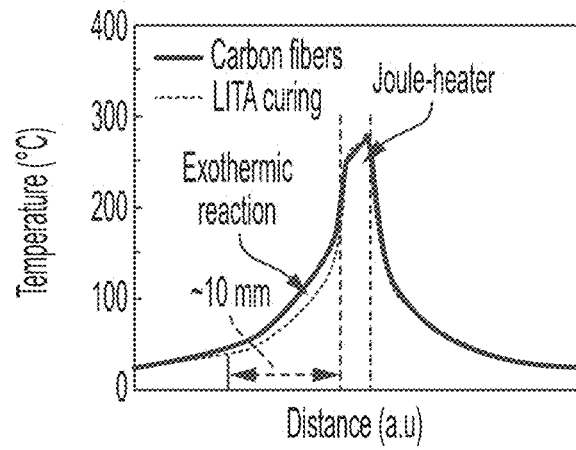

FIG. 2E shows an embodiment, in which temperature distribution profiles confirmed that gradient heating of carbon fibers triggered exothermic curing of the liquid resin, causing a temperature increase. As shown in FIG. 2E, the temperature distribution on the continuous carbon fibers 21 before and after dispensing the liquid thermosetting polymer 31 is plotted, and a temperature increase in the same area of the wicking and curing zone is observed. The temperature increase is from exothermic curing of the thermosetting polymer 31, triggered by the heating of the continuous carbon fibers 21. By contrast, the exothermic reaction of mixing an epoxy resin and a hardener to create the thermosetting polymer 31 creates a low temperature increase, and the small temperature gradient induced by the exothermic reaction of the thermosetting polymer itself from 24.9° C. to 27.2° C. in 3 hours after mixing produces little or no impact on the wicking effect, as compared to the high temperature gradient caused by the external heater.

Figure 2F:
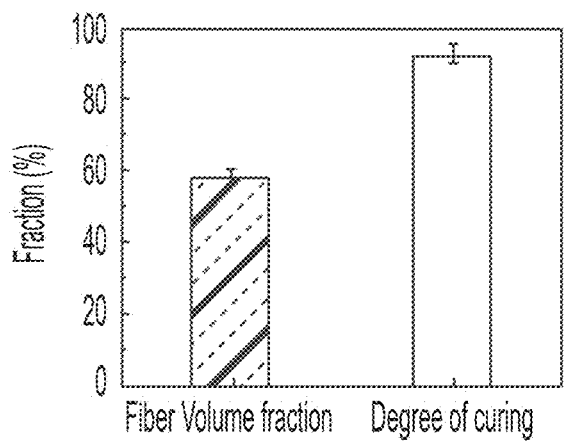
Figure 13:
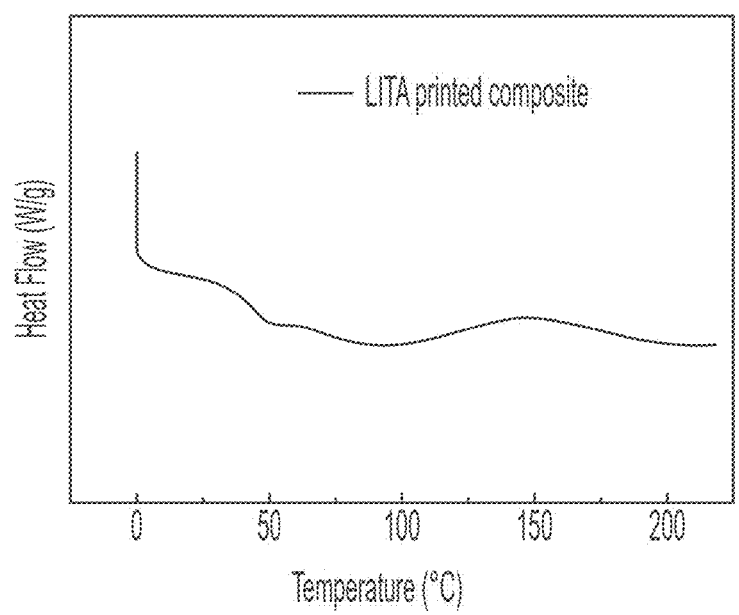
FIG. 13 is a graph schematically showing an exothermic curve of an LITA printed composite in accordance with one exemplary embodiment.

FIG. 2F shows the fiber volume fraction and degree of curing of a 3D printed composite in accordance with one embodiment of the invention. As shown in FIG. 2F, the printed composite exhibits a high fiber volume fraction (up to 58.6%) and high degree of curing (~95%). The data was obtained by measuring five samples, and the error margin is 1.76 and 1.88 for fiber volume fraction and degree of curing, respectively. FIG. 13 shows the exothermic curve of LITA printed composite. It can be seen from FIG. 13 that the cured composite has a little exothermic reaction in the curve. By testing the heat of reaction of the 100% unreacted epoxy resin, the degree of cure of the fiber composites can be calculated using the following equation: Degree of curing=$1-(\Delta H$ Residual Cure$\times Vf/\Delta H$ Full Cure)$\times 100$. The degree of curing was calculated by the exothermic curve of differential scanning calorimetry (DSC) of composite and the liquid resin.

Robotic System

FIGS. 3A-3E are schematic views illustrating an LITA 3D-printing robot system and characterizations of LITA printed composite in accordance with one exemplary embodiment of the invention.

Figure 3A:
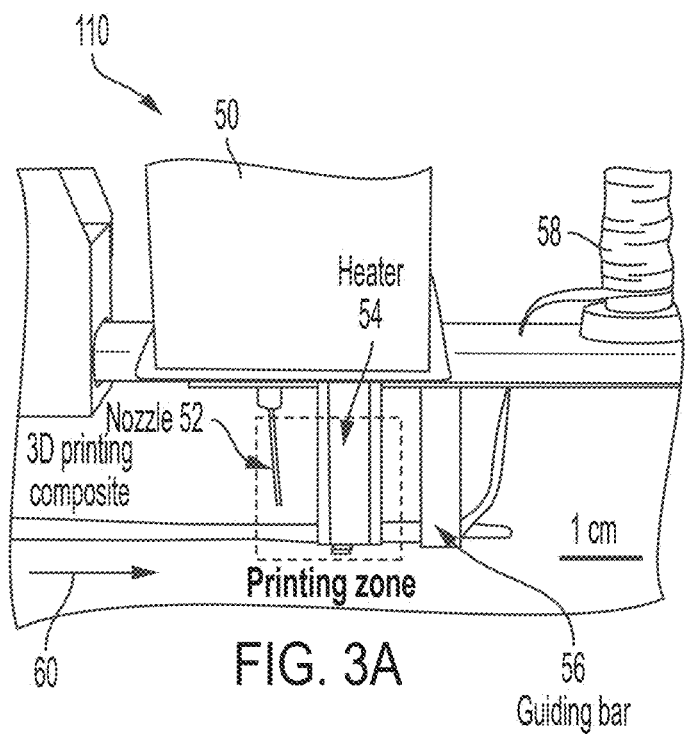
FIGS. 3A-3E are schematic views illustrating the LITA 3D-printing robot system and characterizations of LITA printed composite in accordance with one exemplary embodiment of the invention.
Figure 3B:
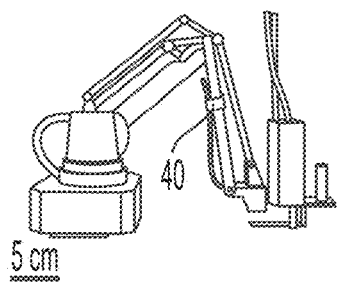

FIGS. 3A and 3B show the LITA 3D-printing robot system, in which an all-in-one design of a printing head consists of a liquid resin nozzle, CNT-based joule heater, guiding bar, and carbon fiber spool. The printing head is controlled by a robot arm to enable printing on 2D and 3D substrates or in free space.

As shown in FIG. 3A, an LITA 3D-printing robot system 110 includes a printing head 50, which may be integrated with functions of liquid dispensing and heating along a printing path 60 having a direction of movement as indicated by the associated arrowhead, for use as the main component of the LITA 3D-printing system 110. As shown in FIG. 3B, the robotic 3D-printing system may include an automated robot arm 40 having at least three degrees of freedom in translation (e.g. X and Y directions on a horizontal plane and the Z direction perpendicular to that plane) to enable printing on 2D and 3D substrates or in free space. The robot arm is not limited to only those degrees of freedom. In some embodiments, the mechanism for moving the printing system may have fewer than three degrees of freedom and may comprise a mechanism other than a robot arm. Systems of the invention are not limited to robotic systems. The printing head 50, in an exemplary all-in-one design, may include a liquid resin nozzle 52 spaced a trailing distance relative to the direction of movement from heater 54 (e.g. a CNT-based joule heater) spaced a trailing distance from a guiding bar 56 (configured to guide the carbon fiber into the desired location to receive the heat and resin), and a carbon fiber spool 58 configured to unspool carbon fiber to be received and guided by the guiding bar. The carbon fiber spool 58 and the guiding bar 56 may together be considered a fiber dispenser. The trailing distance is adjustable. Movement rate and temperature ranges may be determined by thermal and viscosity of thermoset resins.

Figure 3C:
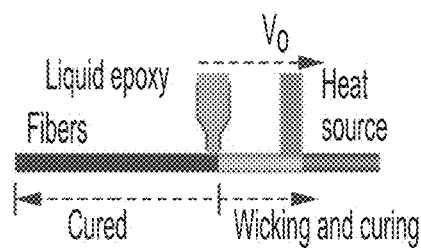

FIG. 3C schematically shows a configuration of continuous feeding of the continuous carbon fibers 21 and dispensing of the liquid resin 31, in which the robot arm 40 controls the movement of the printing head 50 to realize continuous wicking and curing.

Figure 3D:
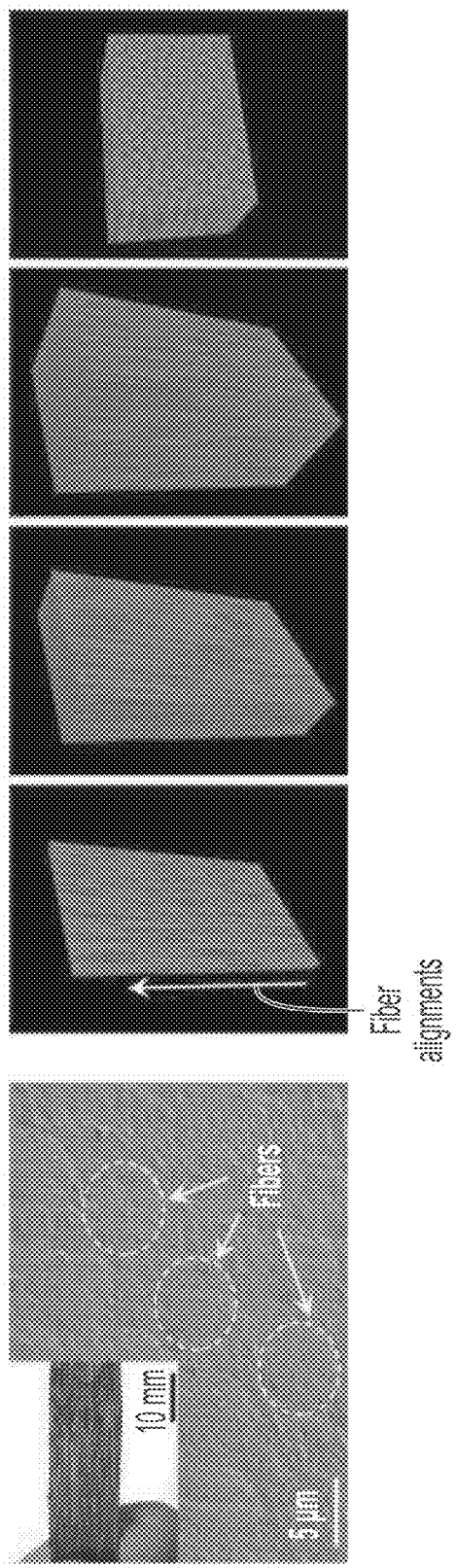

In FIG. 3D, cross-sections of exemplary LITA printed composites show evidence of a dense surface without voids or defects. X-ray computed tomography (CT) for non-destructive inspection of the fiber architecture and identification of fabrication-induced defects, if any, in the internal structure of the composite also showed a densely packed fiber structure, without voids or fiber misalignment. By scanning the interior morphology of the composite at different thicknesses, and reconstructing 3D morphological images, the continuous carbon fibers 21 were shown to be highly aligned and densely packed within the polymer matrix, with no fiber damage, no fiber misalignment, and no voids detected, indicating a good continuous carbon fiber composite structure prepared by the LITA 3D printing approach.

Figure 14B:
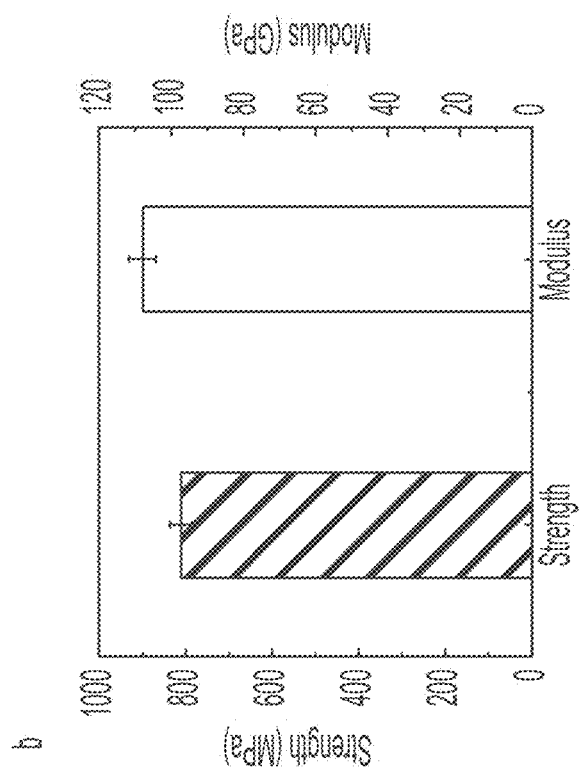
FIGS. 14A and 14B are two graphs schematically showing that an LITA printed continuous fiber composites exhibit good mechanical properties in accordance with one exemplary embodiment.
Figure 14A:
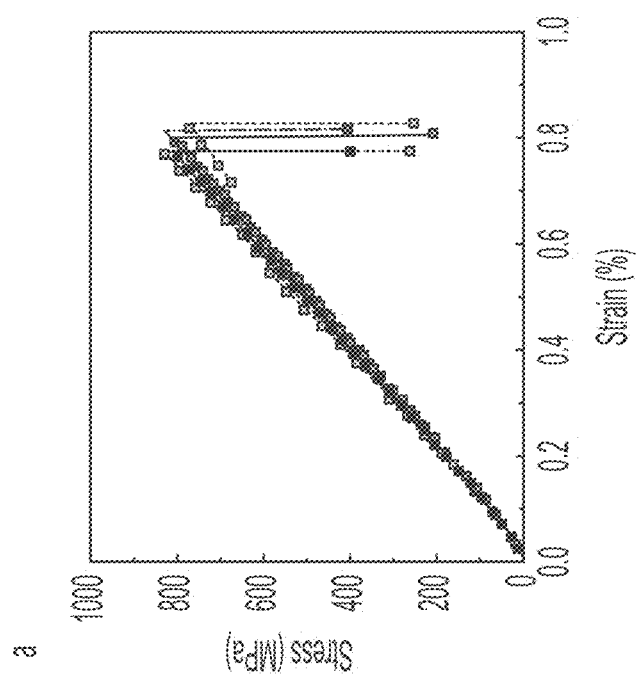

The aligned, highly packed continuous carbon fibers contribute to good mechanical properties of the composite. FIGS. 14A and 14B (Figure S16) show that the LITA 3D printed continuous fiber composites exhibit good mechanical properties. Specifically, FIG. 14A shows a tensile stress-strain curve of the 3D printed composite, and FIG. 14B shows a tensile strength of 810 MPa and a modulus of ~108 GPa. The data are obtained by measuring five samples, and the error margin is 24.5, and 3.62 for tensile strength, and modulus, respectively.

Figure 3E:
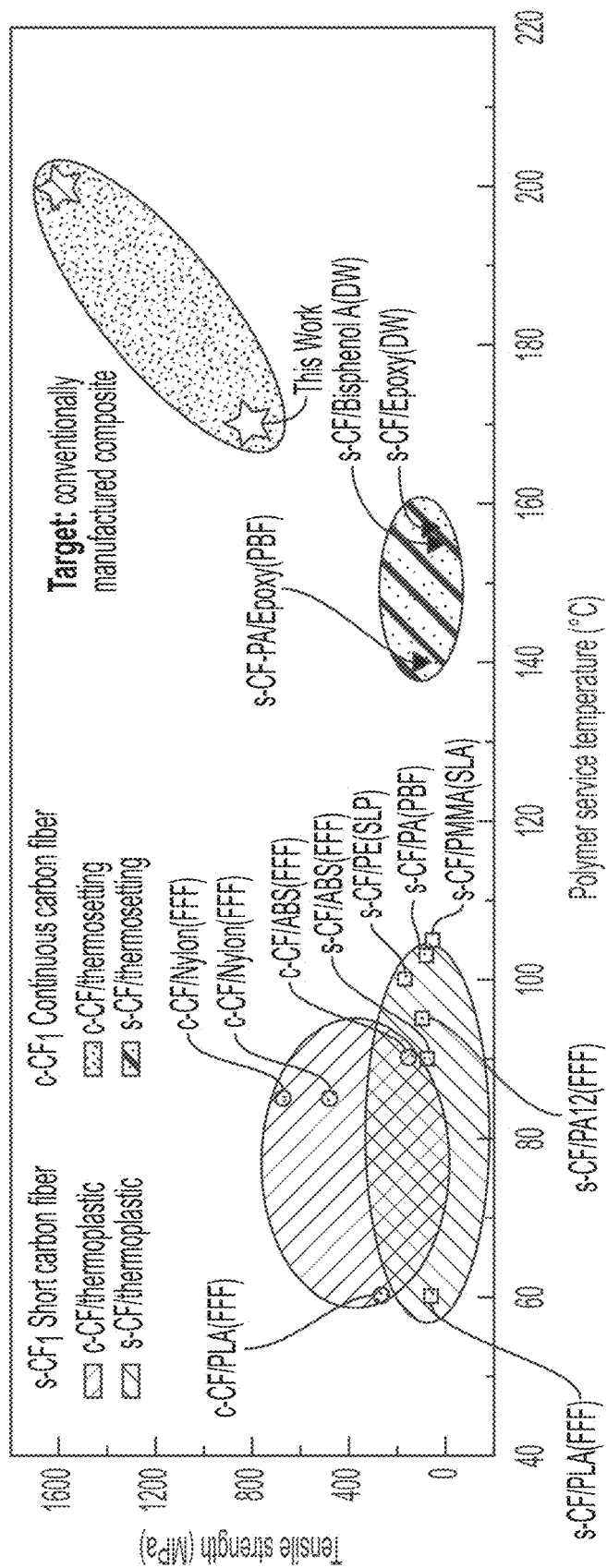

FIG. 3E shows a comparison of tensile strength and service temperature of LITA printed composite with representative 3D printed composites using existing AM techniques. Table S2 below compares the tensile strength and service temperature of the reported 3D printed carbon fiber composites. The service temperature is determined by the polymer thermal properties. For thermoplastic polymers, the glass transition temperature is considered the critical service temperature. For highly cross-linked thermosetting polymers, service temperature is selected at the point of post-heat treatment.

TABLE S2

Comparison of tensile strength and service temperature of LITA printed composite with other reported 3D printed composites using past AM technologies.

| Types of fiber/polymer | Fiber/matrix composition | Tensile properties (MPa) | Service temperature (° C.) | Techniques |
|---|---|---|---|---|
| Short fiber/thermoplastic | Carbon fibers 3.2 mm/ABS | 70 | 90 | FFF |
| | Carbon fibers/high-density polyethylene (PE) | 165 | 100 | SLP |
| | Carbon fibers (150-250 μm)/PA | 72 | 100 | PBF |

TABLE S2-continued

Comparison of tensile strength and service temperature of LITA printed composite with other reported 3D printed composites using past AM technologies.

| Types of fiber/polymer | Fiber/matrix composition | Tensile properties (MPa) | Service temperature (° C.) | Techniques |
|---|---|---|---|---|
| | Carbon fibers (15-20 mm)/PA-12 | 90 | 95 | FFF |
| | Carbon fibers/PLA | 53 | 60 | FFF |
| | Carbon fibers/acrylic-based | 46 | 105 | SLA |
| Continuous fiber/thermoplastic | Recycled carbon fibers/PLA | 260 | 60 | FFF |
| | 1000-carbon fiber bundle/ABS | 150 | 90 | FFF |
| | Carbon fibers/nylon | 475 | 85 | FFF |
| | Carbon fibers/nylon | 667 | 85 | FFF |
| Short fiber thermosetting | SiC whiskers-carbon fibers/epoxy | 66.2 | 160 | DW |
| | Carbon fibers (length 100-150 mm)/Bisphenol A ethoxylate diacrylate | 40 | 150 | DW |
| | Carbon fibers - PA/Epoxy | 101.3 | 155 | PBF |
| | Glass fibers/Ciba-Geigy SL5170 resin | 72 | 150 | SLA |
| Continuous fiber/thermosetting | Carbon fibers/epoxy resin (E-20) | 1476.11 | 160 | FFF |
| | Carbon fibers/epoxy resin (E-54) | 792.8 | 160 | FFF |
| Continuous fiber/thermosetting (This work) | Carbon fibers/Epoxy | ~810 | 180 | LITA |

*Note:
Direct Writing (DW), Fused Filament Fabrication (FFF), V at Photopolmerization (SLA), Powder Bed Fusion (PBF) and Sheet lamination Process (SLP)

In the related art, no 3D printing technique has been reported to allow the direct 3D printing of a continuous carbon fiber/thermosetting composite. Techniques achieved by modifying popular automated composite manufacturing approaches, including tape layup and fiber placement/winding, have been introduced to fabricate structural composites, but these methods require special thermosetting resins as well as post-heat treatment and the use of supporting structures. Most 3D printed composite work has been based on existing AM techniques, such as fused filament fabrication (FFF), direct writing (DW), vat photopolymerization (SLA), powder bed fusion (PBF) and sheet lamination process (SLP), and using short fibers to reinforce thermoplastic polymers, such as polylactic acid (PLA), acrylonitrile butadiene styrene (ABS), polyamide (PA), and polyethylene (PE), and ultraviolet (UV) curable polymers. Due to the low polymer service temperature, low fiber fraction, and low mechanical properties, these 3D printed composite technologies may be inadequate to meet certain practical requirements of commercial applications. The unsupported structure required, the ability to conduct printing in free space, and the ability to print parts with high strength without a need for post curing provides LITA techniques with specific advantages of these prior art processes.

The 3D printed continuous carbon fiber/thermoset composite fabricated by the LITA 3D printing technique may be performed using industrial-grade dry carbon fibers and liquid epoxy resin, which exhibited the highest tensile strength and best service temperature among the reported 3D printed composite works.

Figure 4A:
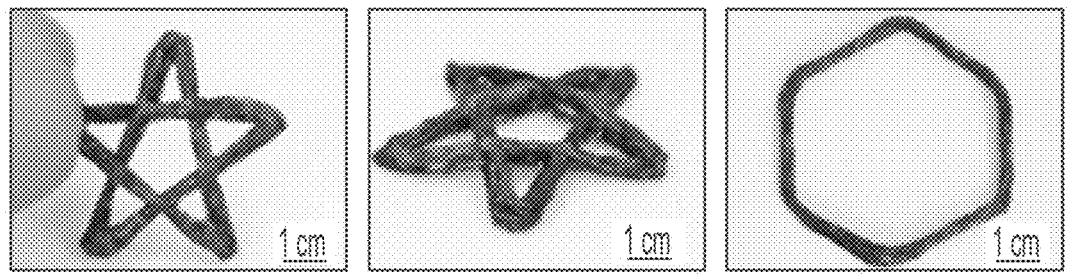
FIGS. 4A-4C are schematic views illustrating some examples of LITA 3D printed composite and illustration of unique features of the LITA technique used by the 3D-printing robot system in accordance with one exemplary embodiment of the invention.
Figure 4B:
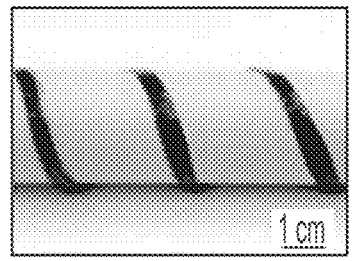
Figure 4C:
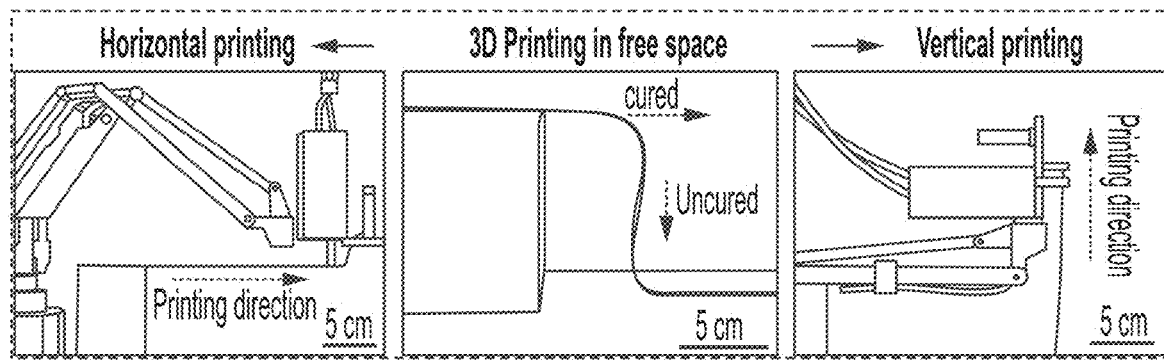

The LITA 3D-printing system offers a wide range of printing capabilities, such as printing objects with complex geometry, conformal printing on curved surfaces, and printing in free space. FIGS. 4A-4C are schematic views illustrating some examples of LITA 3D printed composite and illustration of unique features of the LITA technique used by the 3D-printing robot system in accordance with one exemplary embodiment of the invention.

FIG. 4A shows examples of 3D printed composites in star and hexagonal shapes on a planar substrate. The star-shaped and hexagonal composites (the side length and height of the star-shaped and hexagonal samples are 40 mm×4.5 mm and 32.5 mm×4.5 mm. The error margins of the length and height of the side in hexagonal composites are 1.50 and 0.2, respectively) may be printed by a single continuous carbon fiber tow (~1.8 mm in width and ~120 μm in thickness).

FIG. 4B shows 3D printing on a cylindrical rod, which is conformal 3D printing on a convex surface of a polytetrafluoroethylene (PTFE) tube 30 mm in diameter.

FIG. 4C demonstrates 3D printing in free space, including horizontal and vertical free space printing. As shown in FIG. 4C, the LITA 3D printing allows for carbon fiber/thermoset printing in free space (e.g. in horizontal and/or vertical free space relative to a horizontal planar reference surface). Under the stretching tension provided by the robotic system, the carbon fiber/thermoset composite cures in a free space, without the need for a supporting structure. 3D printing in free space significantly expands design flexibility as well as opens the potential for unlimited dimension of the composite.

The LITA AM process described herein includes a process for depositing and curing thermoset polymer 31 that may also reduce/mitigate interlaminar issues between deposited layers generally associated with 3D composite AM techniques. Due to the thermal gradient distributed on the continuous carbon fiber 21, the liquid thermosetting polymer 31 gradually infiltrates the fiber tow, and the flow process as schematically shown in FIGS. 15A and 15B.

Figure 15A:
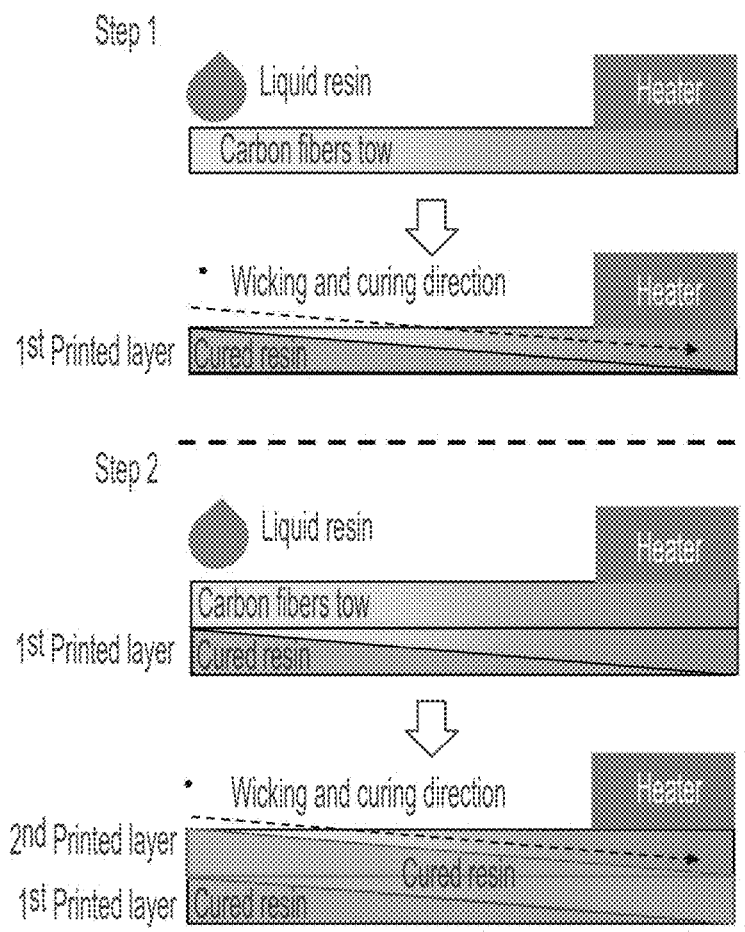
FIGS. 15A and 15B are schematic views illustrating an exemplary flow process of the liquid resin in accordance with one exemplary embodiment.
Figure 15B:
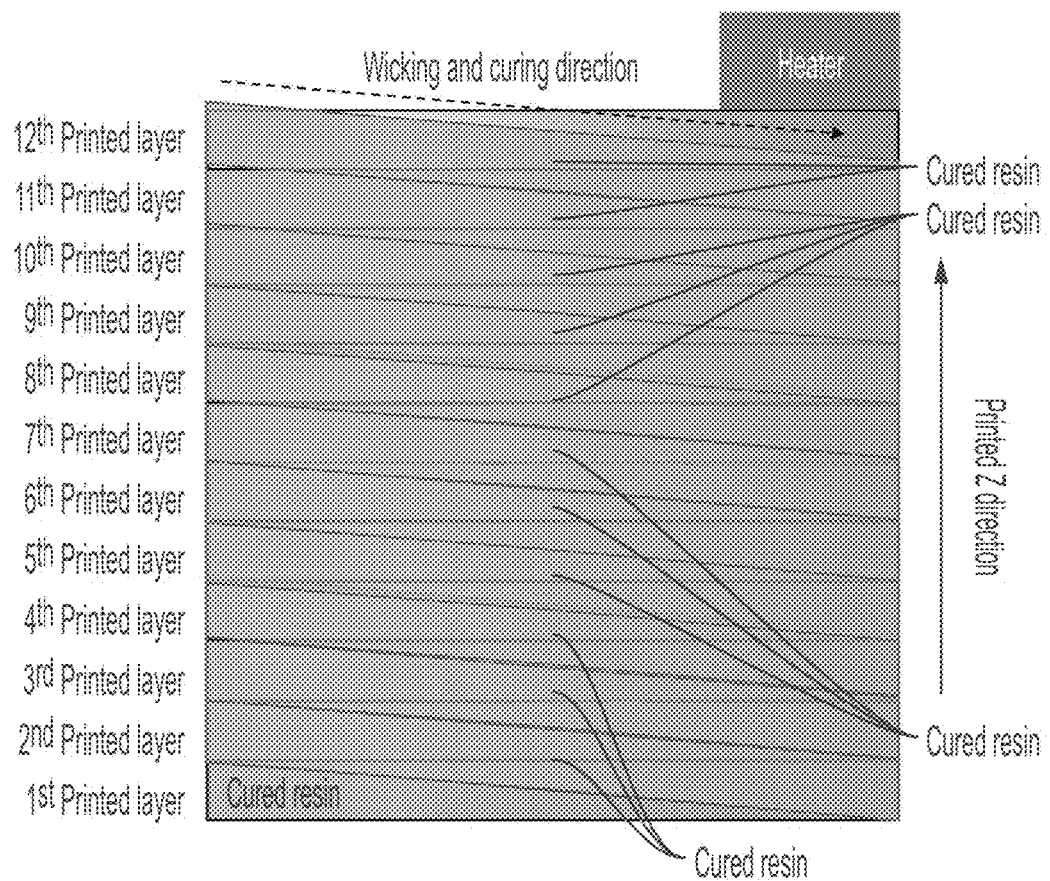
Figure 16:
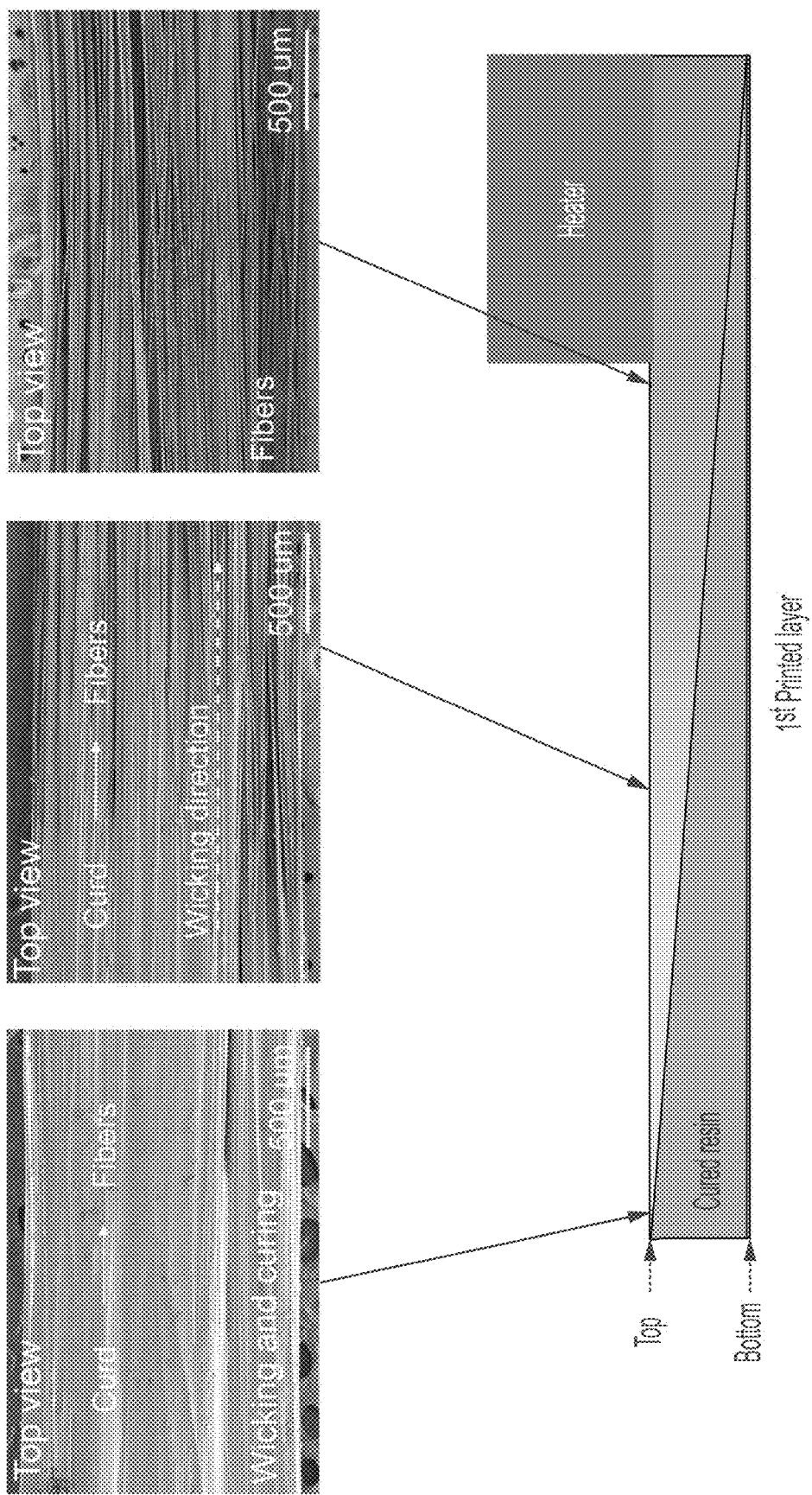
FIG. 16 shows three images of resin infiltration at different positions of the top of printed fiber layer, and schematically shows different surface morphology of wicking and curing of liquid resin in carbon fiber tow in accordance with one exemplary embodiment.

FIG. 15A is a view schematically showing the wicking and curing of the thermosetting polymer 31 during the printing process, and FIG. 15B is a schematic view of multilayer printed fiber composite. FIG. 16 shows images of the resin infiltration at different positions of the top of printed fiber layer (upper side of FIG. 16), and also schematically shows the different surface morphology of wicking and curing of thermosetting polymer in carbon fiber tow (lower side of FIG. 16).

As shown in FIGS. 15A-15B and FIG. 16, when printing a second layer, the liquid resin 31 may infiltrate through the second fiber layer to the bottom layer where the bottom layer was not originally infiltrated with resin. In addition, the heater 10 provides second time of heating to cure the composites to achieve a better cross-linking for good boding at interface. In this case, the thermoset-polymer-rich interface between two layers, which is commonly observed in reported AM composites, may be largely reduced, and as a result, composites made via LITA techniques may enjoy more favorable interlaminar properties relative to the prior art.

According to the embodiments described above, the LITA technique exhibits an array of exceptional features that are highly desirable for 3D printing of composites but generally difficult to achieve using existing AM techniques.

LITA 3D printing has several advantages over existing AM technologies for composites manufacturing. LITA combines wicking and curing of the composite into one near-simultaneous process, compared to existing AM approaches, which often require multiple steps with limited flexibility. LITA allows fibers to be effectively manipulated by densely packing them into the polymer matrix under tension, with minimum fiber distortion and deformation, achieving high mechanical properties. LITA enables near-simultaneous wetting and curing of thermosetting polymers to print the composite layer-by-layer with a high degree of curing and without the need for post curing. Using the LITA technique, a composite can be printed with arbitrary geometry in any angle and direction in free space without the use of support structures. The LITA strategy is compatible with many thermally curable polymers and thermal conductive fibers for composite fabrication.

The distinct advantage of the LITA technique, including the use of continuous industrial-grade carbon fibers and high-performance epoxy resin to fabricate 3D composite, is that it can be readily implemented into composite manufacturing and have a transformative impact on the upgrade of additive manufacturing for light-weight and energy-efficient applications. This LITA 3D printing technique not only provides a rapid, energy efficient, and large-volume 3D printing approach for making composites, but also opens up a new frontier for composite manufacturing and additive manufacturing research. The ability to fabricate net shape and complex geometric composite structures with nearly limitless polymer and fiber combinations offers an array of fundamental and technological opportunities for the design and fabrication of 3D complex multiscale and multimaterial architectures with engineered structures and advanced functionalities.

While not limited to any particular materials, exemplary carbon fibers may comprise T300 3 k from Toray, and an exemplary thermosetting polymer may comprise a liquid neat resin solution comprising a mixture of bisphenol epoxy resin (e.g. System 4600 High Temp Infusion Epoxy Resin, from FiberGlast) and curing agent (also sometimes referred to as a "hardener", such as System 4690 from FiberGlast). In the exemplary embodiments described herein, the weight ratio of the resin to curing agent was 5:1, but the invention is not limited to any particular ratios. For the exemplary resin system as described, the pot lifetime of the mixed resin and hardener is 80-90 minutes at room temperature (25° C.), with the epoxy system hardening in 18 to 24 hours at room temperature. The invention is not limited to any particular resin or fiber components, however, and may be applicable to any system known in the art having suitable characteristics for creating a thermal gradient and dynamic wicking as described herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A process for additive manufacturing of a thermoset resin fiber reinforced composite, comprising the sequential steps of:
   depositing a first layer of fiber material along a path having a direction;
   then, heating the first layer of fiber material using a heater to generate a moving thermal gradient in the first layer of fiber material trailing the heater relative to the path direction; and
   then, dispensing a thermosetting polymer material on the first layer of heated fiber material at a trailing distance the from the heater along the path;
   wherein the thermosetting polymer dynamically wicks into the first layer of fiber material along the thermal gradient in the path direction.

2. The process of claim 1, wherein the first layer of fiber material comprises one or more continuous carbon fibers, a carbon-containing material, or one or more non-carbon fibers coated with a carbon-containing material.

3. The process of claim 2, wherein the thermosetting polymer comprises an epoxy.

4. The process of claim 3, wherein the epoxy comprises two-part system comprising a resin and a curing agent, and the method comprises mixing the resin and the curing agent prior to dispensing the material on the heated first layer of fiber material.

5. The process according to claim 1, wherein the first layer of fiber material comprises a plurality of fibers defining one or more spaces between neighboring fibers and the thermosetting polymer wicks into the one or more spaces and surrounds the plurality of fibers.

6. The process according to claim 1, wherein the first layer of fiber material comprises one or more porous fibers having a plurality of pores and the thermosetting polymer wicks into the one or more pores.

7. The process according to claim 1, wherein the thermosetting polymer has a viscosity that decreases with increasing temperature along the thermal gradient.

8. The process according to claim 1, comprising placing the heater in contact with the first layer of fiber material during the step of heating the fiber material.

9. The process according to claim 1, wherein the path is defined on a 2D or 3D substrate or in free space.

10. The process of claim 1, comprising depositing a plurality of layers one on top of another to form the composite.

11. The process according to claim 1, comprising performing the process using a printing head attached to an automated robot arm having at least three degrees of freedom, wherein the printing head includes a source of the fiber material, a guide for disposing the first layer of fiber material in a desired location, the heater spaced a trailing distance from the guide relative to the path direction, and a dispenser for dispensing the thermosetting polymer material at a trailing distance from the heater.

12. The process of claim 1, wherein the trailing distance from the heater at which the thermosetting polymer material is dispensed on the heated first layer of fiber material is within an effective wicking and curing zone of the heated fiber material defined along a continuous portion of the first layer of fiber material.

13. The process of claim 1, wherein thermal gradient defines an increasing temperature along a continuous portion of the first layer of fiber material that defines the trailing distance, the thermal gradient characterized by a first temperature at a location where the thermosetting polymer material is dispensed on the heated first layer of fiber material and a second temperature at a location closest to the heater, wherein the second temperature is greater than the first temperature.

\* \* \* \* \*